(12) United States Patent
Wong

(10) Patent No.: US 12,706,702 B2
(45) Date of Patent: Aug. 11, 2026

(54) METHODS, COMMUNICATIONS DEVICES, AND NETWORK INFRASTRUCTURE EQUIPMENT

(71) Applicant: Sony Group Corporation, Tokyo (JP)

(72) Inventor: Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 196 days.

(21) Appl. No.: 18/704,080

(22) PCT Filed: Aug. 25, 2022

(86) PCT No.: PCT/EP2022/073718
§ 371 (c)(1),
(2) Date: Apr. 24, 2024

(87) PCT Pub. No.: WO2023/078596
PCT Pub. Date: May 11, 2023

(65) Prior Publication Data

US 2024/0430042 A1 Dec. 26, 2024

(30) Foreign Application Priority Data

Nov. 4, 2021 (EP) .................................... 21206582

(51) Int. Cl.

| | |
|---|---|
| ***H04W 52/32*** | (2009.01) |
| ***H04L 1/1607*** | (2023.01) |
| ***H04L 1/1812*** | (2023.01) |
| ***H04L 1/1829*** | (2023.01) |
| ***H04W 74/08*** | (2024.01) |

(52) U.S. Cl.
CPC .......... *H04L 1/1854* (2013.01); *H04L 1/1671* (2013.01); *H04L 1/1819* (2013.01); *H04L 1/1864* (2013.01)

(58) Field of Classification Search
CPC ... H04L 1/1854; H04L 1/1671; H04L 1/1819; H04L 1/1864
USPC .......................................................... 370/329
See application file for complete search history.

(56) References Cited

U.S. PATENT DOCUMENTS

| | | | | |
|---|---|---|---|---|
| 11,729,807 | B2 * | 8/2023 | Huang | H04L 1/1819 370/329 |
| 2009/0316626 | A1 * | 12/2009 | Lee | H04L 1/1812 370/437 |
| 2013/0195048 | A1 * | 8/2013 | Ekpenyong | H04W 74/0833 370/329 |
| 2016/0105905 | A1 * | 4/2016 | Vajapeyam | H04B 7/0626 370/330 |
| 2016/0211903 | A1 * | 7/2016 | Damnjanovic | H04W 24/10 |
| 2018/0076935 | A1 * | 3/2018 | Seo | H04L 1/00 |
| 2018/0302198 | A1 * | 10/2018 | Wang | H04L 5/0007 |
| 2019/0320431 | A1 * | 10/2019 | Huang | H04L 5/0053 |
| 2020/0228173 | A1 | 7/2020 | Ye et al. | |

(Continued)

FOREIGN PATENT DOCUMENTS

| | | | |
|---|---|---|---|
| EP | 3910852 | A1 | 11/2021 |
| WO | 2020/145704 | A1 | 7/2020 |
| WO | 2021/156107 | A1 | 8/2021 |

OTHER PUBLICATIONS

International Search Report and Written Opinion mailed on Dec. 19, 2022, received for PCT Application PCT/EP2022/073718, filed on Aug. 25, 2022, 9 pages.

(Continued)

*Primary Examiner* — Haresh N Patel
(74) *Attorney, Agent, or Firm* — XSENSUS LLP

(57) ABSTRACT

A method of operating a communications device to receive data from a wireless communications network is provided.

20 Claims, 16 Drawing Sheets

(56) References Cited

U.S. PATENT DOCUMENTS

| | | | | |
|---|---|---|---|---|
| 2020/0404684 | A1* | 12/2020 | Lee | H04L 1/1896 |
| 2022/0167415 | A1* | 5/2022 | Uziel | H04W 72/20 |
| 2023/0155739 | A1* | 5/2023 | Yang | H04L 5/00<br>370/329 |
| 2023/0189263 | A1* | 6/2023 | Lee | H04L 27/26<br>370/329 |
| 2023/0337249 | A1* | 10/2023 | Choi | H04L 1/1854 |
| 2024/0323956 | A1* | 9/2024 | Kou | H04W 72/21 |
| 2024/0365305 | A1* | 10/2024 | Elshafie | H02J 50/001 |
| 2025/0119231 | A1* | 4/2025 | Zewail | H04W 72/1273 |
| 2025/0119916 | A1* | 4/2025 | Huang | H04W 72/1268 |
| 2025/0119925 | A1* | 4/2025 | Zewail | H04L 5/0023 |
| 2025/0393047 | A1* | 12/2025 | Löhr | H04W 72/1268 |

OTHER PUBLICATIONS

Holma et al.,"LTE for UMTS OFDMA and SC-FDMA Based Radio Access", John Wiley and Sons Ltd., 2009, 232 pages.

Nokia et al., "HARQ-ACK Feedback Enhancements for URLLC/IIoT", 3GPP TSG RAN WG1 #106-e, R1-2106636, Agenda item: 8.3.1.1, Aug. 16-27, 2021, 27 pages.

Catt, "UE feedback enhancements for HARQ-ACK", 3GPP TSG RAN WG1 #106-e, R1-2106962, Agenda Item: 8.3.1.1, Aug. 16-27, 2021, 12 pages.

Huawei, "New WID: Physical Layer Enhancements for NR Ultra-Reliable and Low Latency Communication (URLLC)", 3GPP TSG RAN Meeting #83, RP-190726, Agenda Item: 9.1.1, Mar. 18-21, 2019, 5 pages.

Nokia et al., "Revised WID: Enhanced Industrial Internet of Things (IoT) and ultra-reliable and low latency communication (URLLC) support for NR", 3GPP TSG RAN Meeting #88e, RP-201310, Agenda Item: 9.10.5, Jun. 29-Jul. 3, 2020, 6 pages.

3GPP, "Study on Scenarios and Requirements for Next Generation Access Technologies (Release 14)", 3GPP TR 38.913 V14.3.0, Jun. 2017, 39 pages.

ZTE: "Discussion on ehanced intra-UE multiplexing", 3GPP TSG RAN WG1 #106-e, R1-2106737, Agenda item: 8.3.3, Aug. 16-27, 2021, 25 pages.

* cited by examiner

Scenario for multiplexing of deferred HARQ-ACK of different L1 priorities

Multiplexing decision follows the Mux Indicator of the last PDSCH

METHODS, COMMUNICATIONS DEVICES, AND NETWORK INFRASTRUCTURE EQUIPMENT

CROSS-REFERENCE TO RELATED APPLICATIONS

The present application is based on PCT/EP2022/073718, filed Aug. 25, 2022, which claims priority from European Patent Application No. 21206582.5, filed Nov. 4, 2021, the entire contents of each are incorporated herein by reference.

BACKGROUND

Field of Disclosure

The present disclosure relates to a communications device, network infrastructure equipment and methods of operating a communications device to receive data from a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected routinely and efficiently to support communications with an ever-increasing range of devices associated with a wider range of data traffic profiles and types than existing systems are optimized to support. For example, it is expected future wireless communications networks will be expected efficiently to support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterized by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device to receive data from a wireless communications network. The method comprises receiving a plurality of downlink transmissions in physical downlink shared channel (PDSCH) resources of a wireless access interface provided by the wireless communications network, each of the plurality of downlink transmissions being a transmission of a data unit according to a different Hybrid Automatic Repeat Request, HARQ, process, and one or more of the downlink transmissions is in pre-configured communications resources of the PDSCH, such as Semi-Persistent Scheduled (SPS) downlink transmissions. The method further comprises determining a HARQ acknowledgement or negative acknowledgement, HARQ-ACK, for each of the plurality of received downlink transmissions in accordance with whether the data unit for the HARQ process was correctly received or not, and identifying for each of the HARQ-ACKs one of a plurality of different physical layer priorities for transmitting the HARQ-ACK. The physical layer priorities can be referred to as L1 priorities and for example can be a high priority (HP) or a low priority (LP). The method further comprises identifying target uplink communications resource, in which one or more of the HARQ-ACKs can be transmitted for one of the plurality of the downlink transmissions as a first transmission of the HARQ-ACK for the received downlink transmission in the target uplink communications resource. The uplink communications resource can be a physical uplink control channel (PUCCH) or a physical uplink shared channel (PUSCH). The method further comprises determining whether the HARQ-ACK for one or more others of the plurality of the downlink transmissions can be multiplexed with the HARQ-ACK being transmitted as a first transmission of the HARQ-ACK into the target uplink communications resource as uplink control information, and transmitting the uplink control information in the target uplink communications resource comprising the HARQ-ACK for the downlink transmission which can be transmitted as a first transmission of the HARQ-ACK, multiplexed with the HARQ-ACK for the one or more others of the plurality of the downlink transmissions. The determining whether the HARQ-ACK for the one or more others of the plurality of the downlink transmissions can be multiplexed with the HARQ-ACK being transmitted as a first transmission of the HARQ-ACK is based on a combination of the identified uplink physical layer priority for transmitting the HARQ-ACK for the one or more others of the plurality of the downlink transmissions and the HARQ-ACK being transmitted as a first transmission, and a multiplex (Mux) indicator for one or both of the target uplink communications resource for transmitting the uplink control information and each of the plurality of downlink transmissions.

Embodiments can provide a more efficient use of communications resources of a wireless access interface and reduce a latency for transmitting HARQ-ACK's by configuring a communications device to multiplex HARQ-ACK's for PDSCH transmissions having different L1 priorities into an uplink communications resource such as a PUCCH. The communications device can determine whether or not to multiplex the HARQ-ACK's from other PDSCH into a PUCCH or PUSCH carrying the HARQ-ACK for which the communications device has determine that it can transmit this HARQ-ACK for a received downlink transmission as a first transmission of that HARQ-ACK, depending on a Mux indicator status for either the target PUCCH/PUSCH for the PDSCH transmission and a physical L1 priority for transmission the HARQ-ACK's. Embodiments may therefore lead to an improved efficiency of communications resources utilization as will be explained in more detail below.

Embodiments of the present technique, which, in addition to methods of operating communications devices, relate to methods of operating infrastructure equipment, communications devices and infrastructure equipment, circuitry for communications devices and infrastructure equipment, wireless communications systems, computer programs, and computer-readable storage mediums, can allow for more efficient use of communication resources by a communications device operating in a wireless communications network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
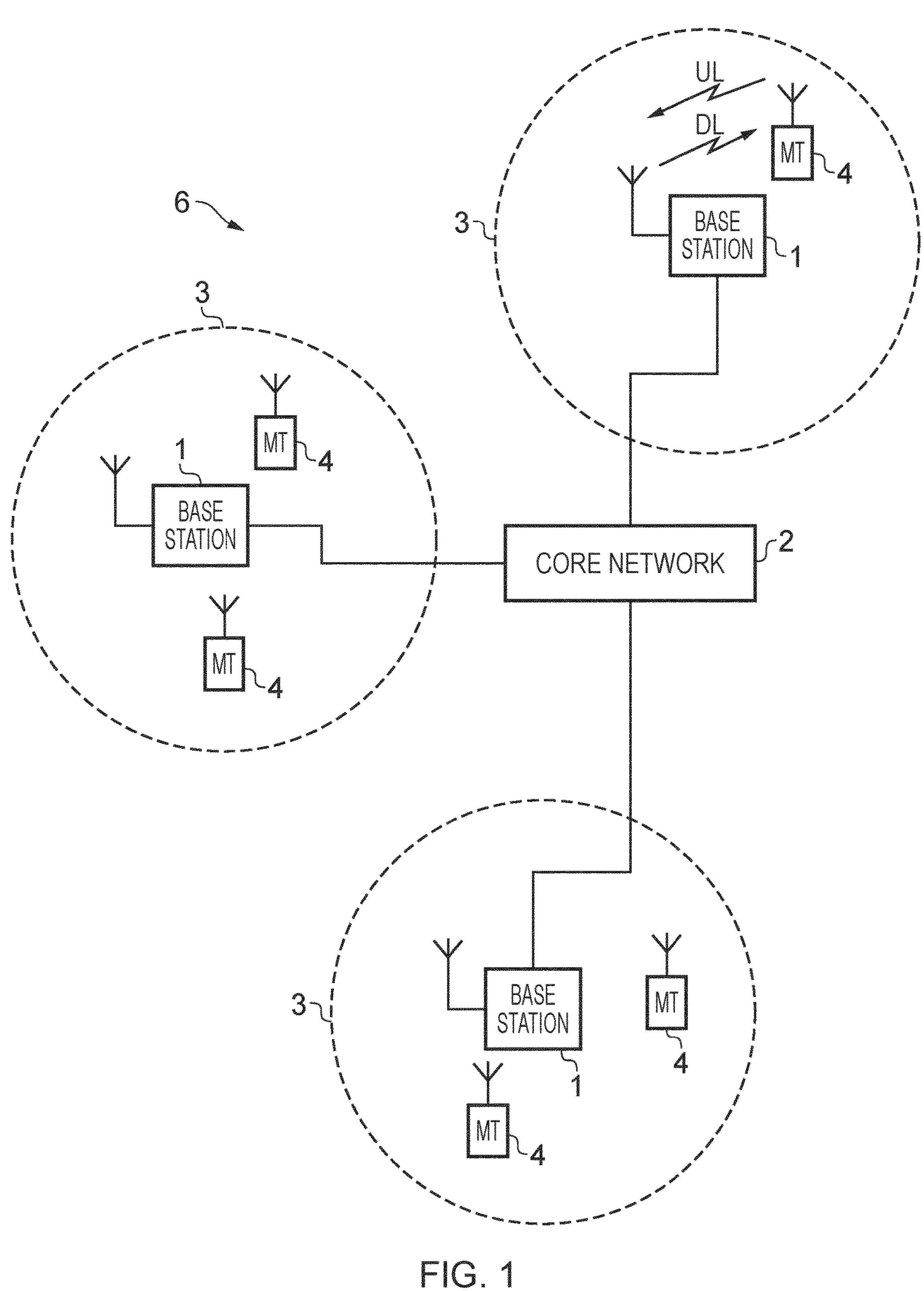
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
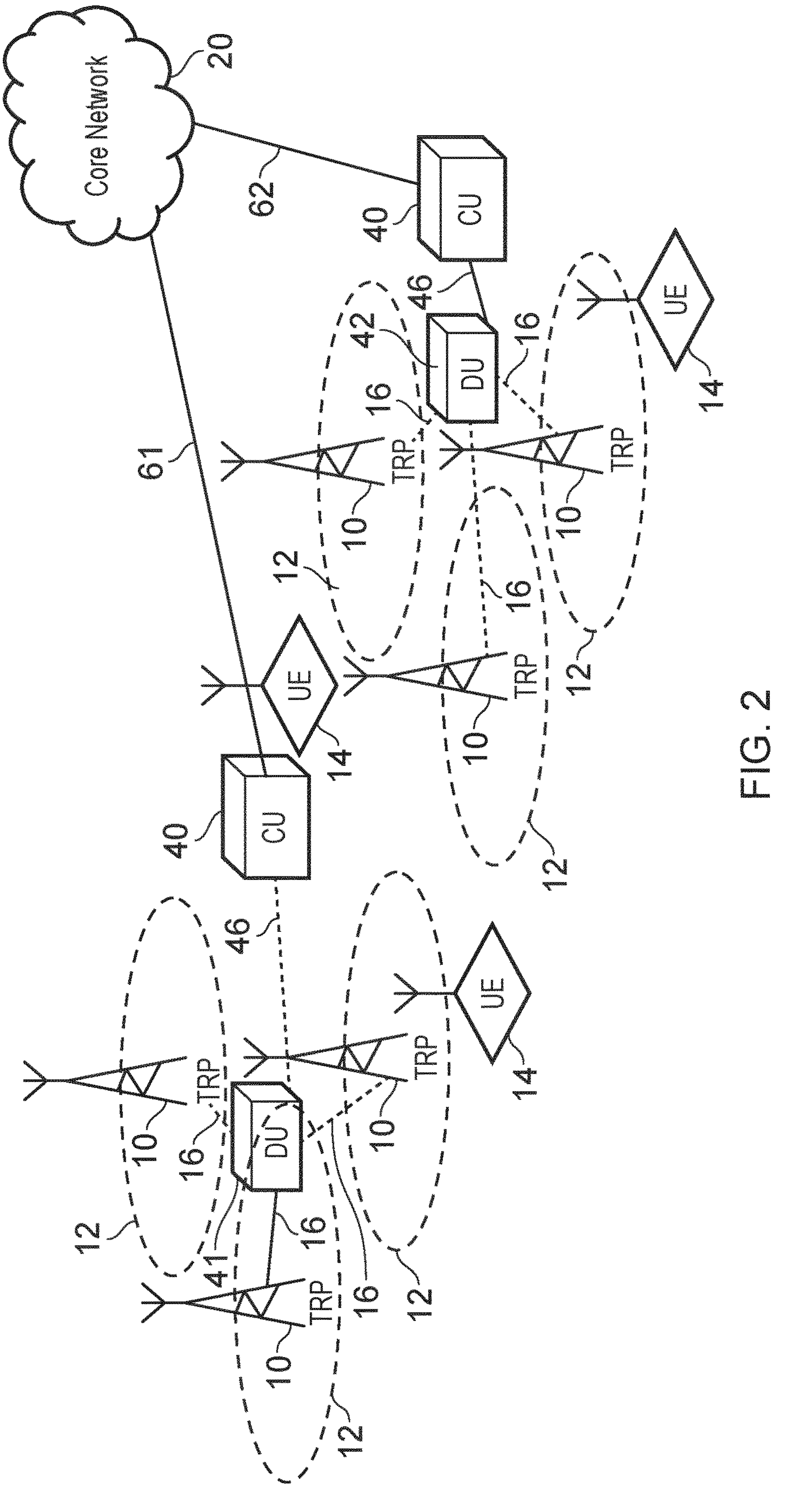
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signaling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
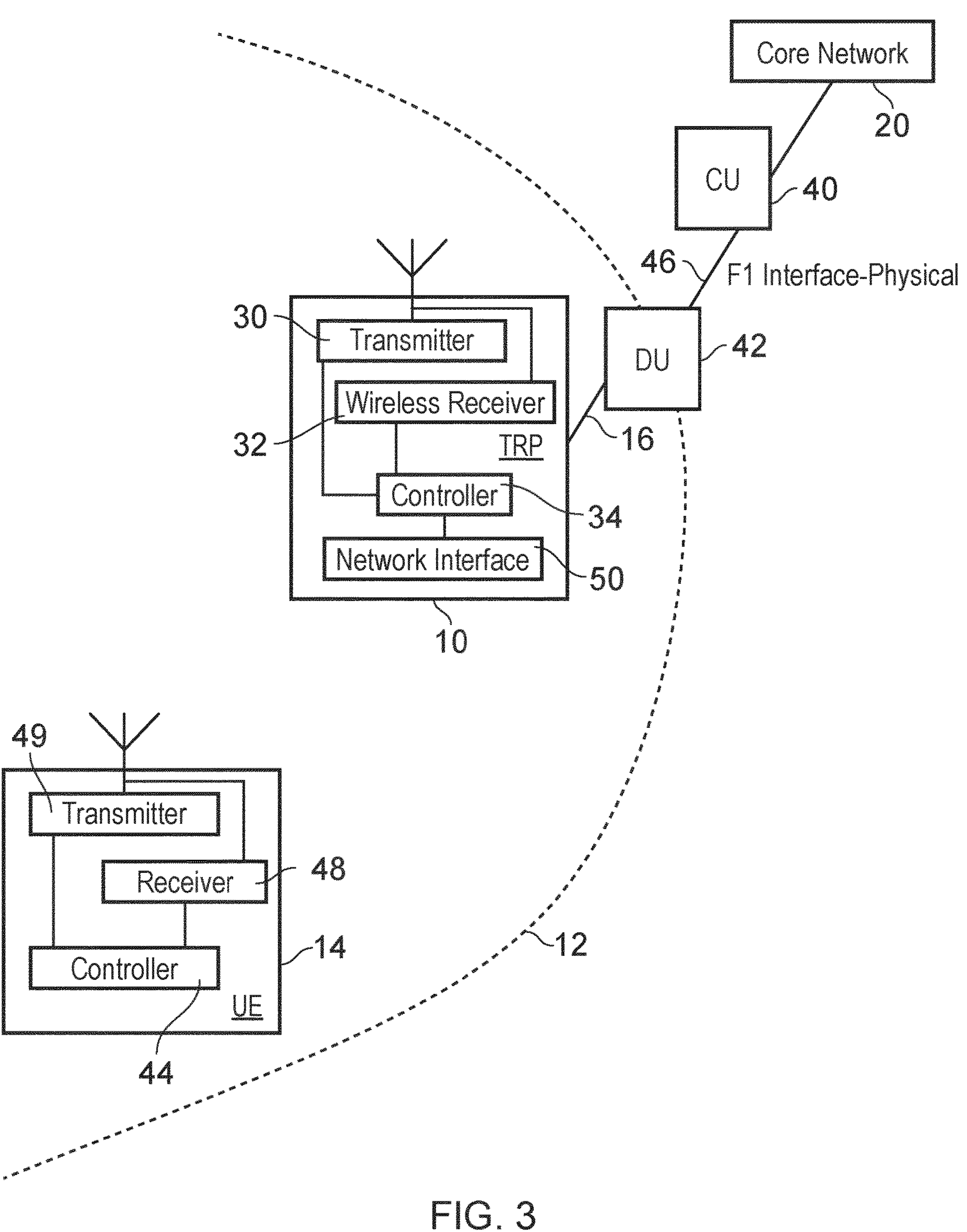
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter circuit 49, a receiver circuit 48 and a controller circuit 44 which is configured to control the transmitter circuit 49 and the receiver circuit 48 to transmit signals representing uplink data to the wireless communications network via the wireless access interface formed by the TRP 10 and to receive downlink data as signals transmitted by the transmitter circuit 30 and received by the receiver circuit 48 in accordance with the conventional operation.

The transmitter circuits 30, 49 and the receiver circuits 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controller circuits 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for case of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signaling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

eURLLC and eMBB

Systems incorporating NR technology are expected to support different services (or types of services), which may be characterized by different requirements for latency, data rate and/or reliability. For example, Enhanced Mobile Broadband (eMBB) services are characterized by high capacity with a requirement to support up to 20 Gb/s. The requirements for Ultra Reliable and Low Latency Communications (URLLC) services are for one transmission of a 32 byte packet to be transmitted from the radio protocol layer 2/3 SDU ingress point to the radio protocol layer 2/3 SDU egress point of the radio interface within 1 ms with a reliability of $1\text{-}10^{-5}$ (99.999%) or higher (99.9999%) [2].

Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3] specifies features that require high reliability and low latency, such as factory automation, transport industry, electrical power distribution, etc. in a 5G system. eURLLC is further enhanced as IIoT-URLLC [4], for which one of the objectives is to enhance UE feedback for Hybrid Automatic Repeat Request Acknowledgements (HARQ-ACK) signaling for downlink transmissions (for example, PDSCH).

PDSCH HARQ-ACK/NACK Signaling

Embodiments of the disclosure relate to a communications device and methods of operating a communications device (UE) in a wireless communications network for handling HARQ (Hybrid Automatic Repeat Request) feedback in respect of downlink transmissions in physical downlink shared channel (PDSCH) resources of a wireless access interface provided by the wireless communications network.

As will be appreciated, HARQ feedback is transmitted by a communications device (such as a UE) to an infrastructure equipment (such as a gNB) in respect of a scheduled PDSCH to inform the infrastructure equipment whether or not the communications device has successfully decoded the corresponding PDSCH. Each PDSCH may be transmitted according to a different HARQ process which may be assigned a particular HARQ Process Number (HPN) to identify the HARQ process for that PDSCH. The HPN number may be assigned by infrastructure equipment in the wireless communications network such as a gNB. Each HARQ process involves transmitting a HARQ acknowledgment (i.e. an ACK) or a HARQ negative acknowledgment (i.e. a NACK) depending on whether the PDSCH transmitted according to that HARQ process was successfully received/decoded. For example, if the PDSCH was successfully received/decoded, the receiving communications device will send a HARQ acknowledgment (i.e. an ACK), and if the transmission was not successfully received the communications device will send a HARQ negative acknowledgment (i.e. a NACK).

It will be appreciated by one skilled in the art that references to "HARQ-ACK" can represent either an "ACK" or a "NACK", and is therefore used when it is not necessary to distinguish between an "ACK" and a "NACK".

For scheduled transmission of downlink data from an infrastructure equipment to a communications device in a wireless communications network, it is common for the infrastructure equipment to first send control signaling, e.g. on a downlink control channel (such as a PDCCH—Physical Downlink Control Channel), comprising downlink control information (DCI) which indicates (grants) downlink resources that are to be used to transmit the data, e.g. on a downlink shared channel (such as a PDSCH).

From this DCI, the communications device can determine uplink resources to use to send uplink control information (UCI) comprising an ACK or NACK in respect of the data, e.g. on an uplink control channel (such as a PUCCH), although it may also be on an uplink shared channel (such as a PUSCH). The communications device then seeks to receive the data on the indicated resources on the PDSCH. If the communications device successfully decodes the data, then the communications device transmits UCI on the determined uplink resources comprising an ACK. If the communications device does not successfully decode the data, the communications device transmits UCI on the determined uplink resources comprising a NACK. This allows the infrastructure equipment to determine if it should schedule a retransmission of the data.

So as to provide some particular examples, certain embodiments of the disclosure will be described herein in the context of HARQ-ACK transmissions in respect of downlink transmissions of URLLC data and using terminology, for example in respect of channel names such as PUCCH and PDSCH and signaling names, such as DCI and UCI, which are typically used in connection with current 3GPP wireless communications networks. However, it will be appreciated this is only for convenience, and in general the approaches discussed herein are applicable for other service types and in wireless communications networks which use different terminology. Thus, references herein to PUCCH should, unless the context demands otherwise, be read as referring to a physical uplink control channel generally, and not specifically to a particular format of physical uplink control channel, and so on for other channels and terminology that may be referred to herein.

As will be appreciated, resources of a wireless access interface comprise a grid of communications resources (i.e. a radio frame structure) spanning frequency and time. The frequency dimension is divided into sub-carriers and the time dimension is divided into OFDM symbols that are grouped into slots and sub-slots.

Dynamic Grant PDSCH

As explained above, embodiments are related to the handling of HARQ feedback in respect of PDSCH resources of a wireless access interface provided by the wireless communications network. One way of providing PDSCH resources for downlink transmissions is by dynamic grant PDSCH. In a Dynamic Grant Physical Downlink Shared Channel (DG-PDSCH), a PDSCH resource is dynamically indicated by a gNB using a downlink Grant carried by Downlink Control Information (DCI) in a Physical Downlink Control Channel (PDCCH).

A PDSCH is transmitted using HARQ transmission, where for a PDSCH ending in slot n, the corresponding Physical Uplink Control Channel (PUCCH) carrying the HARQ-ACK is transmitted in slot $n+K_1$. In Dynamic Grant PDSCH, the value of $K_1$ is indicated in field "PDSCH-to-HARQ_feedback timing indicator" of the DL Grant (carried by DCI Format 1_0, DCI Format 1_1 or DCI Format 1_2). Multiple, different PDSCHs can point to the same slot for transmission of their respective HARQ-ACKs. The HARQ-ACKs to be transmitted in the same slot are multiplexed into a single PUCCH. Hence, a PUCCH can contain multiple HARQ-ACKs for multiple PDSCHs.

Figure 4:
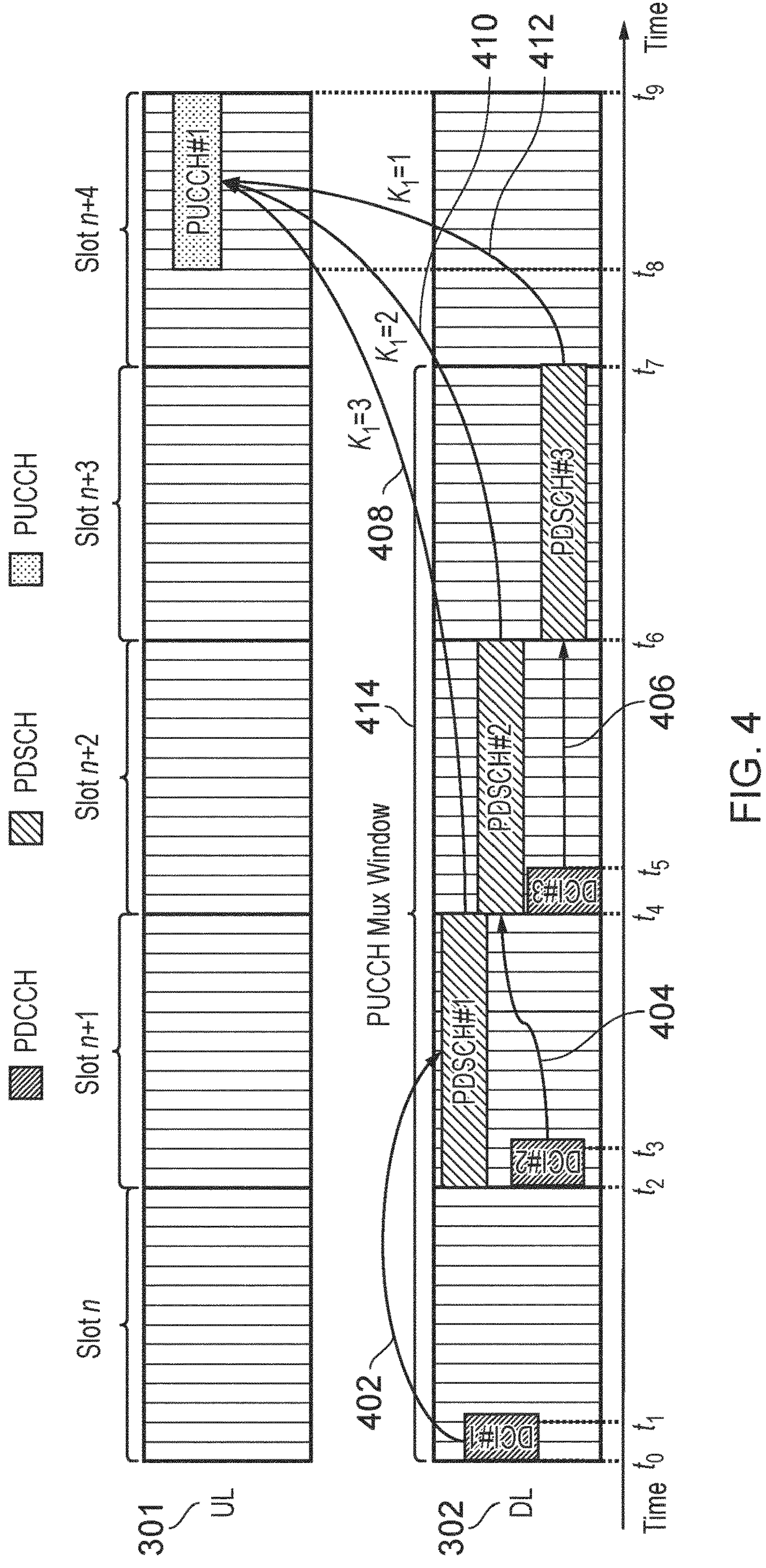
FIG. 4 is an illustrative representation of communications resources in time and frequency for uplink and downlink channels of a time divided wireless access interface in which multiple Hybrid Automatic Repeat Request Acknowledgements (HARQ-ACK) may be multiplexed onto a single Physical Uplink Control Channel (PUCCH)

An example of multiplexing multiple HARQ-ACKs is schematically shown on radio communications grids in FIG. 4. The upper half of FIG. 4 represents an uplink radio resource grid comprising communications resources for uplink transmissions 301, and the bottom half of FIG. 4 represents a downlink radio resource grid comprising communications resources for downlink transmissions 302. The horizontal axis is time and the vertical axis is frequency. FIG. 4 represents an example scenario in which communications resources are utilized by a communications device (UE) 4, 14 during a period spanning five slots. The five slot period spans slots n to n+4. In slot n, the communications device 4, 14 receives a first DCI labelled "DC #1". As represented by arrow 402, DCI #1 indicates an allocation of communication resources for transmitting a first physical downlink shared channel, labelled "PDSCH #1", in slot n+1. A PDSCH-to-HARQ feedback timing indicator in DCI #1 has a value of $K_1$=3. As represented by arrow 408, the value of $K_1$=3 indicates slot n+4 for transmitting a HARQ-ACK in respect of PDSCH #1. In slot n+1, the communications device 4, 14 receives a second DCI labelled "DCI #2". As represented by arrow 404, DCI #2 indicates an allocation of communication resources for transmitting a second physical downlink shared channel, labelled PDSCH #2. in slot n+2. A PDSCH-to-HARQ_feedback timing indicator in DCI #2 has a value of $K_1$=2. As represented by arrow 410, the value of $K_1$=2 indicates slot n+4 for transmitting a HARQ-ACK in respect of PDSCH #2. In slot n+2, the communications device 4, 14 receives a third DCI labelled "DCI #3". As represented by arrow 406, DCI #3 indicates an allocation of communication resources for transmitting a third physical downlink shared channel, labelled PDSCH #3, in slot n+3. A PDSCH-to-HARQ_feedback timing indicator has a value of $K_1$=1 which therefore indicates slot n+4 for transmitting a HARQ-ACK in respect of PDSCH #3 as represented by arrow 412. Thus, as represented by respective arrows 408, 410, 412, the HARQ-ACKs for each of the three downlink transmissions on the physical downlink shared channel are scheduled to be transmitted by the communications device 4, 14 in a first uplink control channel, labelled PUCCH #1, in slot n+4. The HARQ-ACKs for each of the three downlink transmissions are therefore transmitted in a multiplexed manner. To support this multiplexed HARQ-ACK function, a Multiplexing Window may be defined. The Multiplexing Window is a time window indicating how many PDSCHs can have their associated HARQ-ACK signaling multiplexed in PUCCH in a single slot and may depend on the range of $K_1$ values. In the example in FIG. 4, the PUCCH Multiplexing Window 414 is assumed to be from slot n to slot n+3, which means the max $K_1$ value that can be used in this period is 4.

As explained above, a DCI may include a "PDSCH-to-HARQ_feedback timing indicator" providing a $K_1$ value which indicates a slot for transmitting a HARQ-ACK in respect of a PDSCH scheduled by the DCI. As will be appreciated by one skilled in the art, the DCI may also include a "PUCCH Resource Indicator" (PRI) field which indicates communications resources within the slot indicated by the value of $K_1$ for transmitting the HARQ-ACK in respect of the PDSCH scheduled by the DCI. In the example represented in FIG. 4, only one PUCCH is indicated for the communications device 4, 14 in slot n+4 (i.e. PUCCH #1). For wireless communications networks operating in accordance with Release 15 of the 3GPP standards, only one PUCCH per slot is allowed to carry HARQ-ACKs for the same communications device even if PUCCHs in the same slot do not overlap in time. For example, if a PRI field in two different downlink grants indicate two different PUCCH resources in the same slot, the communications device will follow the PRI indicated in the last PDSCH in the PUCCH Multiplexing Window since the communications device only knows the total number of HARQ-ACK bits after the last PDSCH is received.

Figure 5:
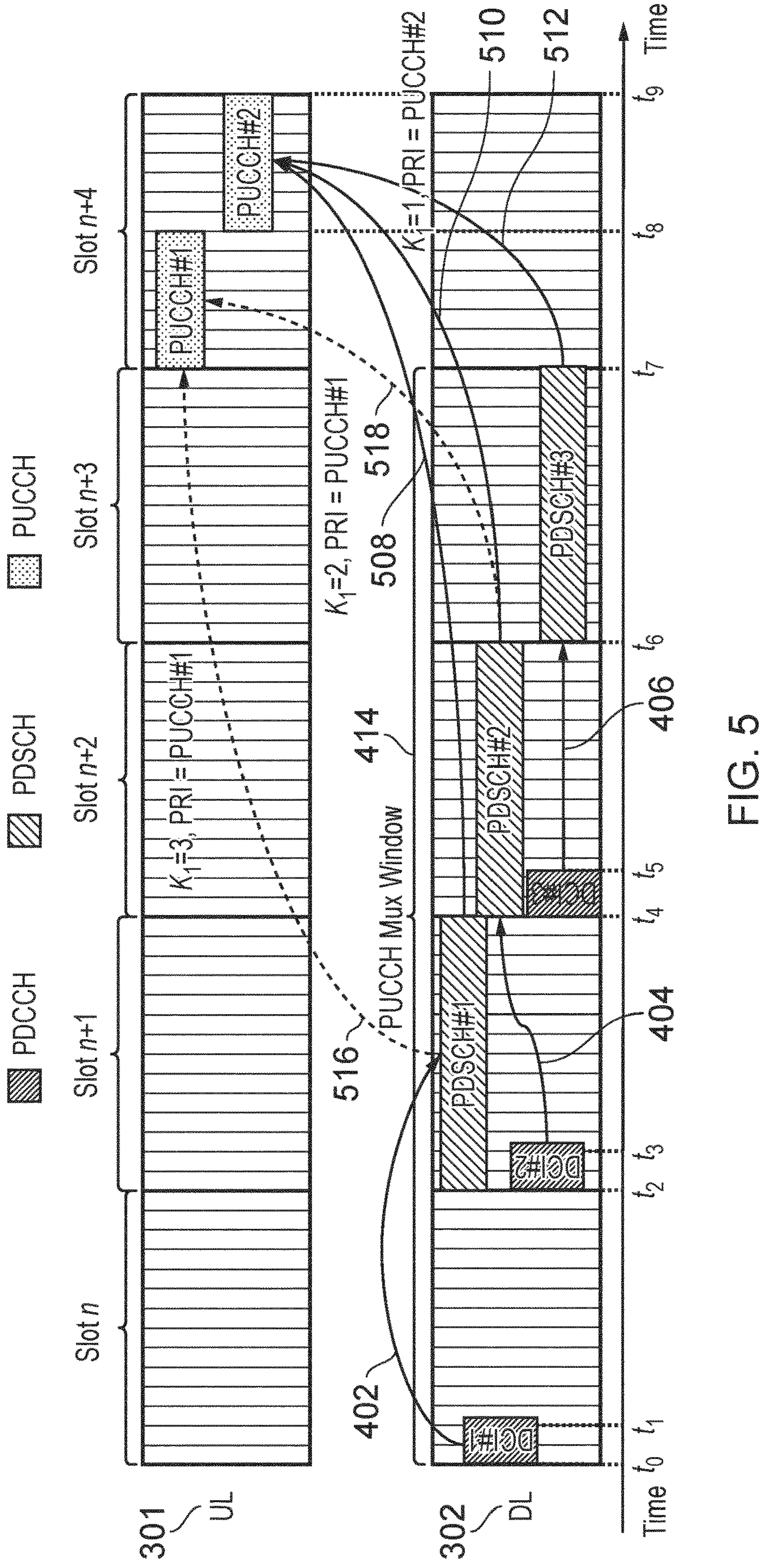
FIG. 5 is an illustrative representation of communications resources in time and frequency for uplink and downlink channels of a time divided wireless access interface in which a PUCCH Resource Indicator is used to indicate onto which PUCCH HARQ-ACKs may be multiplexed.

An example of two non-overlapping PUCCH resources being scheduled in the same slot is illustrated in FIG. 5. FIG. 5 is similar to, and will be understood from, FIG. 4, but this example schematically illustrates a scenario in which two PUCCH resources are indicated in the same slot. In the interests of brevity, only the differences between FIGS. 4 and 5 will be explained.

As represented by dashed arrow 516, a PRI field in DCI #1 indicates communications resources in PUCCH #1 in slot n+4 for transmitting a HARQ-ACK in respect of PDSCH #1. As represented by dashed arrow 518, a PRI field in DCI #2 also indicates communications resources in PUCCH #1 in slot n+4 for transmitting a HARQ-ACK in respect of PDSCH #2. As represented by arrow 512, a PRI field in DCI #3 indicates communications resources in a second physical uplink control channel labelled "PUCCH #2" in slot n+4 for transmitting a HARQ-ACK in respect of PDSCH #3.

Thus, as represented by respective dashed arrows 516 and 518, the HARQ-ACK for each of PDSCH #1 and PDSCH #2 are respectively scheduled to be transmitted by the communications device in slot n+4 using PUCCH #1, and, as represented by arrow 512, the HARQ-ACK for PDSCH #3 is scheduled to be transmitted by the communications device in slot n+4 using PUCCH #2. In this example, PUCCH #1 and PUCCH #2 do not overlap in time. Since DCI #3 schedules the last PDSCH in the Multiplexing Window 414 (i.e. PDSCH #3), the communications device 4, 14 will use the communications resources indicated by DCI #3 to transmit a HARQ-ACK in respect of PDSCH #1, 2 and 3. For example, as represented by respective arrows 508, 510 and 512, the communications device 4, 14 uses PUCCH #2 to carry the HARQ-ACKs for PDSCH #1 and PDSCH #2 and PDSCH #3. It will be appreciated that a PUCCH carrying other uplink control information such as Scheduling Request (SR) can be transmitted separately to a PUCCH carrying HARQ-ACK within the same slot if they do not overlap in time.

For Release 16 of the 3GPP standards, the possibility of sub-slot operation for HARQ-ACK acknowledgement signaling was introduced. Sub-slot operation for HARQ-ACK allows the timings of HARQ-ACK uplink control information on PUCCH to be configured with a resolution or granularity which is less than one slot. In other words, the HARQ-ACK process operates with sub-slot timing granularity. Sub-slot based PUCCH thus allows more than one PUCCH carrying HARQ-ACKs to be transmitted within a slot. This provides for more opportunities for PUCCH carrying HARQ-ACK in respect of PDSCH transmissions to be transmitted within a slot, thereby potentially helping to reduce the latency of HARQ-ACK. In a sub-slot based PUCCH, the granularity of the $K_1$ parameter is in units of sub-slot instead of slot, where the sub-slot size can be 2 symbols or 7 symbols. It will be appreciated that the $K_1$ parameter indicates the time difference between the end of a PDSCH and the start of its corresponding PUCCH. An example of sub-slot HARQ-ACK operation is shown in FIG. 6.

Figure 6:
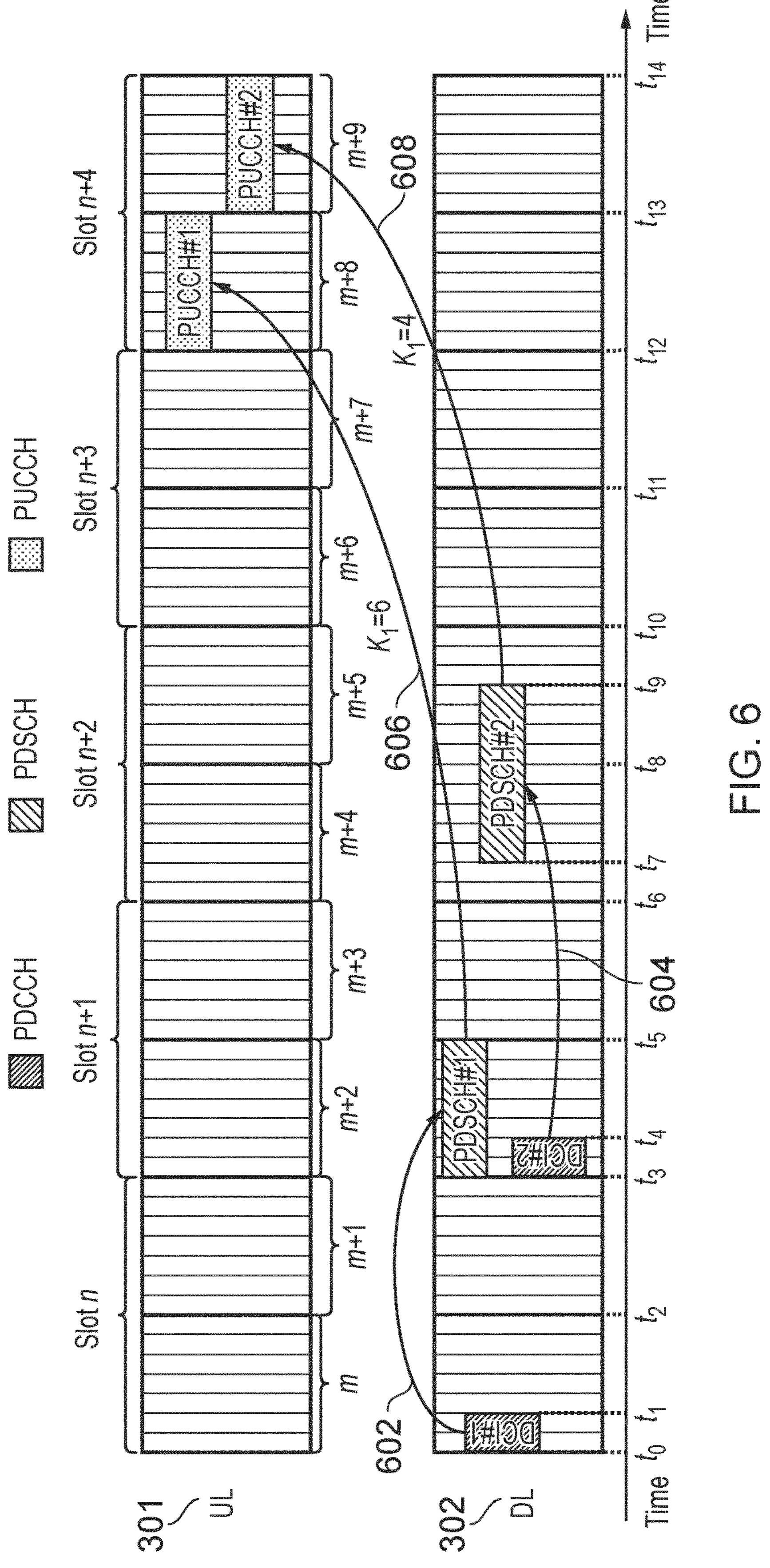
FIG. 6 is an illustrative representation of communications resources in time and frequency for uplink and downlink channels of a time divided wireless access interface in which an example of sub-slot based PUCCH is shown.

FIG. 6 is similar to, and will be understood from, FIG. 4, but this example schematically illustrates a scenario that supports sub-slot operation for HARQ-ACK with a sub-slot size of 7 symbols, which is half a slot length in this case. Thus FIG. 6 schematically shows communication resources used by the communications device 4, 14 in an example scenario during a period spanning five slots or ten sub-slots. The five slots are labelled as slots n to n+4 and the 10 sub-slots are labelled as sub-slots m to m+9. In sub-slot m, the communications device 4, 14 receives a first DCI labelled "DCI #1". As represented by arrow 602, DCI #1 indicates an allocation of communication resources on a first PDSCH, labelled PDSCH #1, in sub-slot m+2 with a PDSCH-to-HARQ_feedback timing indicator value of $K_1$=6. Therefore, as represented by arrow 606, DCI #1 indicates communications resources of a first physical uplink control channel labelled "PUCCH #1" in sub-slot m+8 for transmitting a HARQ-ACK in respect of PDSCH #1. As represented by arrow 604, DCI #2 indicates an allocation of communications resources on a second PDSCH, labelled PDSCH #2, that spans sub-slots m+4 and m+5 with a PDSCH-to-HARQ_feedback timing indicator value of $K_1$=4. Therefore, as represented by arrow 608, DCI #2 indicates communications resources of a second physical uplink control channel labelled "PUCCH #2" in sub-slot m+9 for transmitting a HARQ-ACK in respect of PDSCH #2. In a sub-slot based operation such as the operation explained with respect to FIG. 6, a communications device can transmit two PUCCH carrying HARQ-ACK (i.e. PUCCH #1 and PUCCH #2) in the same slot. This contrasts with approaches according to Release 15 of the 3GPP standards specification series, where only one PUCCH carrying HARQ-ACK is allowed in a slot.

Semi-Persistent Scheduling (SPS)

As explained above, PDSCH resources used for the transmission of downlink data can be scheduled by a gNB dynamically in dynamic grant PDSCH. Another way of providing PDSCH resources for downlink transmissions is through the allocation of Semi-Persistent Scheduling (SPS) resources.

Similar to the use of Configured Grants (CGs) in the uplink, the use of SPS in the downlink reduces latency, particularly for regular and periodic traffic. The gNB is required to explicitly activate and deactivate SPS resources when it determines they may be required. These SPS resources are typically configured via Radio Resource Control (RRC) signaling, and occur periodically where each SPS PDSCH occasion has a pre-configured and fixed duration. This allows the gNB to schedule traffic that has a known periodicity and packet size. The gNB may or may not transmit any PDSCH in any given SPS PDSCH occasion, and so the communications device is required to monitor each SPS PDSCH occasion for a potential PDSCH transmission.

In Release 15 of the 3GPP standards, the communications device can only be configured with one SPS PDSCH and this SPS PDSCH is activated using an activation DCI (Format 1_0 or 1_1) with the Cyclic Redundancy Check (CRC) scrambled with a Configured Scheduling Radio Network Temporary Identifier (CS-RNTI). Once an SPS PDSCH is activated, the communications device will monitor for a potential PDSCH in each SPS PDSCH occasion of the SPS PDSCH configuration without the need for any DL Grant until the SPS PDSCH is deactivated. Deactivation of the SPS PDSCH is indicated via a deactivation DCI scrambled with CS-RNTI. The communications device provides a HARQ-ACK for the deactivation DCI, but no HARQ-ACK is provided for an activation DCI.

Similar to DG-PDSCH, the slot containing the PUCCH resource for HARQ-ACK corresponding to SPS PDSCH is indicated using the $K_1$ value in the field "PDSCH-to-HARQ feedback timing indicator" of the activation DCI. Since a dynamic grant is not used for SPS PDSCH, this $K_1$ value is applied for every SPS PDSCH occasion, and can only be updated after it has been deactivated and re-activated using another activation DCI with a different $K_1$ value.

Since there is only one SPS PDSCH, PUCCH Format 0 or 1 is used to carry the HARQ-ACK. If the PUCCH collides with a PUCCH carrying HARQ-ACK for a DG-PDSCH, the HARQ-ACK for SPS PDSCH is multiplexed into the PUCCH corresponding to the DG-PDSCH.

In Release 16 of the 3GPP standards, the communications device can be configured with up to eight SPS PDSCHs, where each SPS PDSCH has an SPS Configuration Index that is RRC configured. Each SPS PDSCH is individually activated using a DCI (Format 1_0, 1_1 & 1_2) with the CRC scrambled with CS-RNTI, where the DCI indicates the SPS Configuration Index of the SPS PDSCH to be activated. However, multiple SPS PDSCHs can be deactivated using a single deactivation DCI. Similar to Release 15 of the 3GPP standards, the communications device provides a HARQ-ACK for the deactivation DCI, but does not provide one for the activation DCI.

The slot or sub-slot containing the PUCCH resource for HARQ-ACK corresponding to an SPS PDSCH occasion is determined using the $K_1$ value indicated in the activation DCI. Since each SPS PDSCH configuration is individually activated, different SPS PDSCH can be indicated with different $K_1$ values.

Since different $K_1$ values can be used for different SPS PDSCH configurations, it is possible that the HARQ-ACK for multiple SPS PDSCHs point to the same slot or sub-slot and in such a scenario, these HARQ-ACKs are multiplexed into a single PUCCH. For multiple SPS PDSCH configurations, PUCCH Format 2, 3 & 4 (in addition to PUCCH Format 0 & 1) can be used to carry multiple HARQ-ACKs for SPS PDSCH. Here the HARQ-ACKs in the PUCCH are sorted in ascending order according to the DL slot for each of the SPS PDSCH Configuration Indices and then sorted in ascending order of the SPS PDSCH Configuration Index. It will be appreciated that, since typically the $K_1$ value is fixed per SPS PDSCH then it is unlikely to have two or more SPS PDSCHs with the same index multiplexed into a PUCCH.

Figure 7:
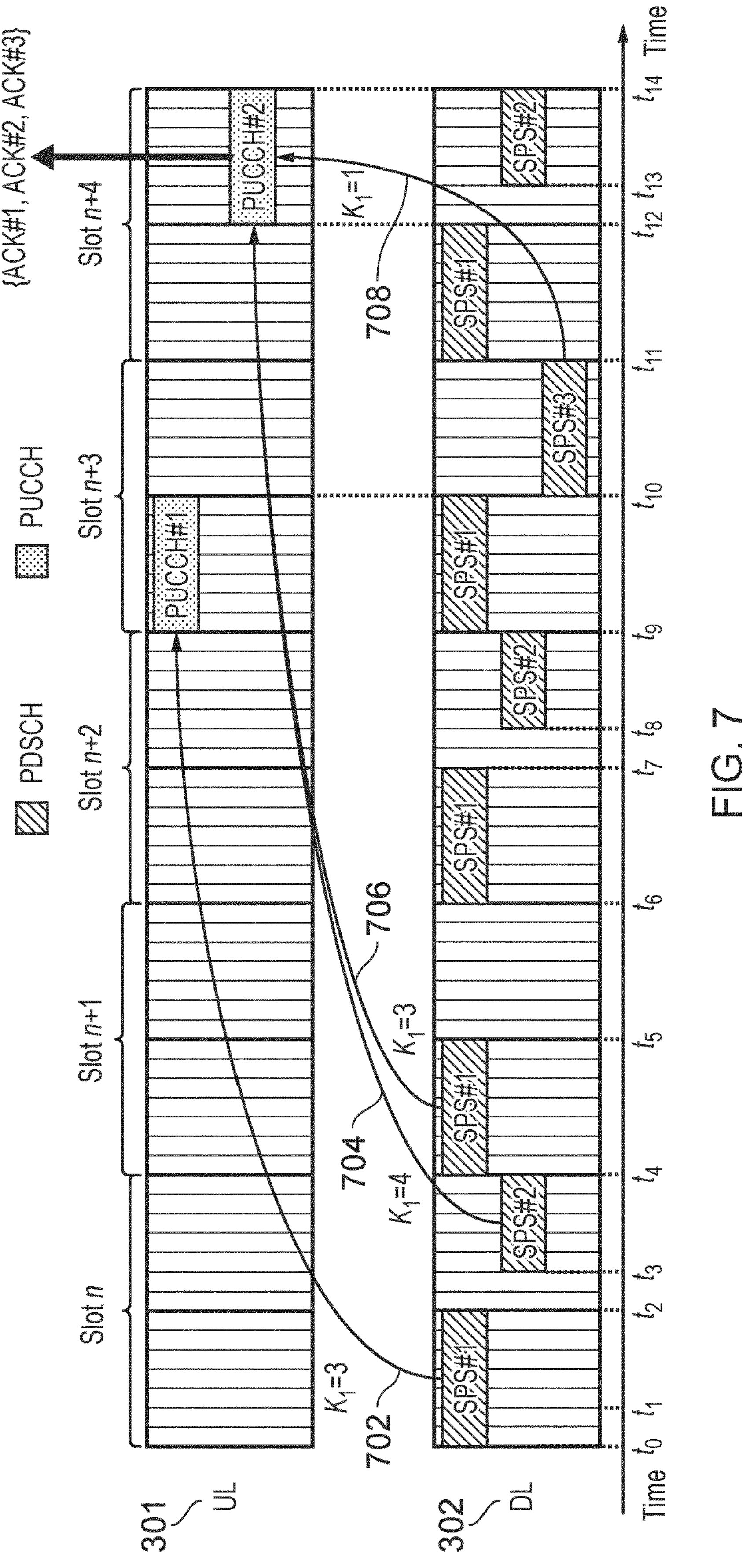
FIG. 7 is an illustrative representation of communications resources in time and frequency for uplink and downlink channels of a time divided wireless access interface in which multiple HARQ-ACKs for Semi-Persistent Scheduling (SPS) Physical Downlink Shared Channels (PDSCHs) are be multiplexed onto a single PUCCH per sub-slot.

An example of HARQ-ACK transmission for multiple SPS PDSCHs on a grid of communications resources is schematically shown in FIG. 7. In FIG. 7, a communications device is configured with three SPS PDSCHs labelled as SPS #1, SPS #2 and SPS #3. As shown, each of the SPS #1, SPS #2 and SPS #3 have different periodicities which are RRC configured with SPS Configuration Index 1, 2 and 3respectively. SPS #1, SPS #2 and SPS #3 are activated with $K_1$=3, $K_1$=4 and $K_1$=1 respectively. As such, and as represented by respective arrows 704, 706 and 708, the HARQ-ACKs for SPS #2 in slot n, SPS #1 in slot n+1 and SPS #3 in slot n+3 are transmitted in the same slot, i.e. carried by PUCCH #2, in slot n+4. PUCCH #2 therefore provides three HARQ-ACKs labelled as {ACK #1, ACK #2, ACK #3} for SPS #1, SPS #2 and SPS #3 respectively according to their SPS PDSCH Configuration Indices. In this example, there is only one unique SPS PDSCH per DL slot that have HARQ-ACK multiplexed into PUCCH #2.

When the PUCCH for SPS PDSCHs collides with PUCCH for DG-PDSCH, the HARQ-ACK for the SPS PDSCH and the DG-PDSCH are multiplexed. In such cases, the HARQ-ACK for the SPS PDSCH is appended after the HARQ-ACK for DG-PDSCH.

Uplink L1 Priority

In Release 15 of the 3GPP standards, no priority levels were defined at the Physical Layer for when two uplink transmissions collide. Instead, the information contained in the uplink transmissions is multiplexed and transmitted using a single channel. As will be appreciated, possible uplink transmission collisions include collisions between PUCCH and PUCCH or between PUCCH with PUSCH. However, physical layer priority levels are not to be confused with Logical Channel Priority levels which have been defined for the MAC layer in Release 15, where there are 16 priority levels.

A UE can be configured to provide eMBB and URLLC services. Since eMBB and URLLC have different latency requirements, their uplink transmissions may collide. For example, after an eMBB uplink transmission has been scheduled, an urgent URLLC packet arrives which would need to be scheduled immediately and transmission may collide with the eMBB transmission. In order to handle such intra-UE collisions with different latency and reliability requirements, two priority levels at the Physical Layer were introduced in Release 16 of the 3GPP standards for uplink transmissions. These priority levels apply for the PUCCH and PUSCH. For example, a high priority PUCCH could take precedence over a low priority PUSCH; or a high priority PUSCH could take precedence over a low priority PUCCH; or a high priority PUCCH could take precedence over a low priority PUCCH etc). Therefore, according to Release 16, when two uplink transmissions with different Physical Layer priority levels (L1 priority) collide, the UE will drop the lower priority transmission. If both uplink transmissions have the same L1 priority, then the UE reuses Release 15 procedures, for example, by multiplexing the uplink transmissions which have the same L1 priority in a channel. The gNB indicates the L1 priority to the UE in a1 bit "Priority indicator" DCI field, where "0" indicates low L1 priority (LP) and "1" indicates high L1 priority (HP) and:

- For PUSCH, the L1 priority is indicated in the UL Grant carried by DCI Format 0_1 and 0_2
- For PUCCH carrying a HARQ-ACK for PDSCH, the L1 priority is indicated in the DL Grant scheduling a PDSCH, carried by DCI Format 1_1 and 1_2

Since the PUCCH can have two L1 priorities, two HARQ-ACK codebooks of different priorities can be configured for a UE. This allows high L1 priority HARQ-ACKs to be multiplexed into a high L1 priority HARQ-ACK codebook and low L1 priority HARQ-ACKs to be multiplexed into a low L1 priority HARQ-ACK codebook. An example of multiplexing high L1 priority HARQ-ACKs in a high L1 priority HARQ-ACK codebook and multiplexing low priority HARQ-ACKs in a low L1 priority HARQ-ACK codebook is illustrated in FIG. 8.

Figure 8:
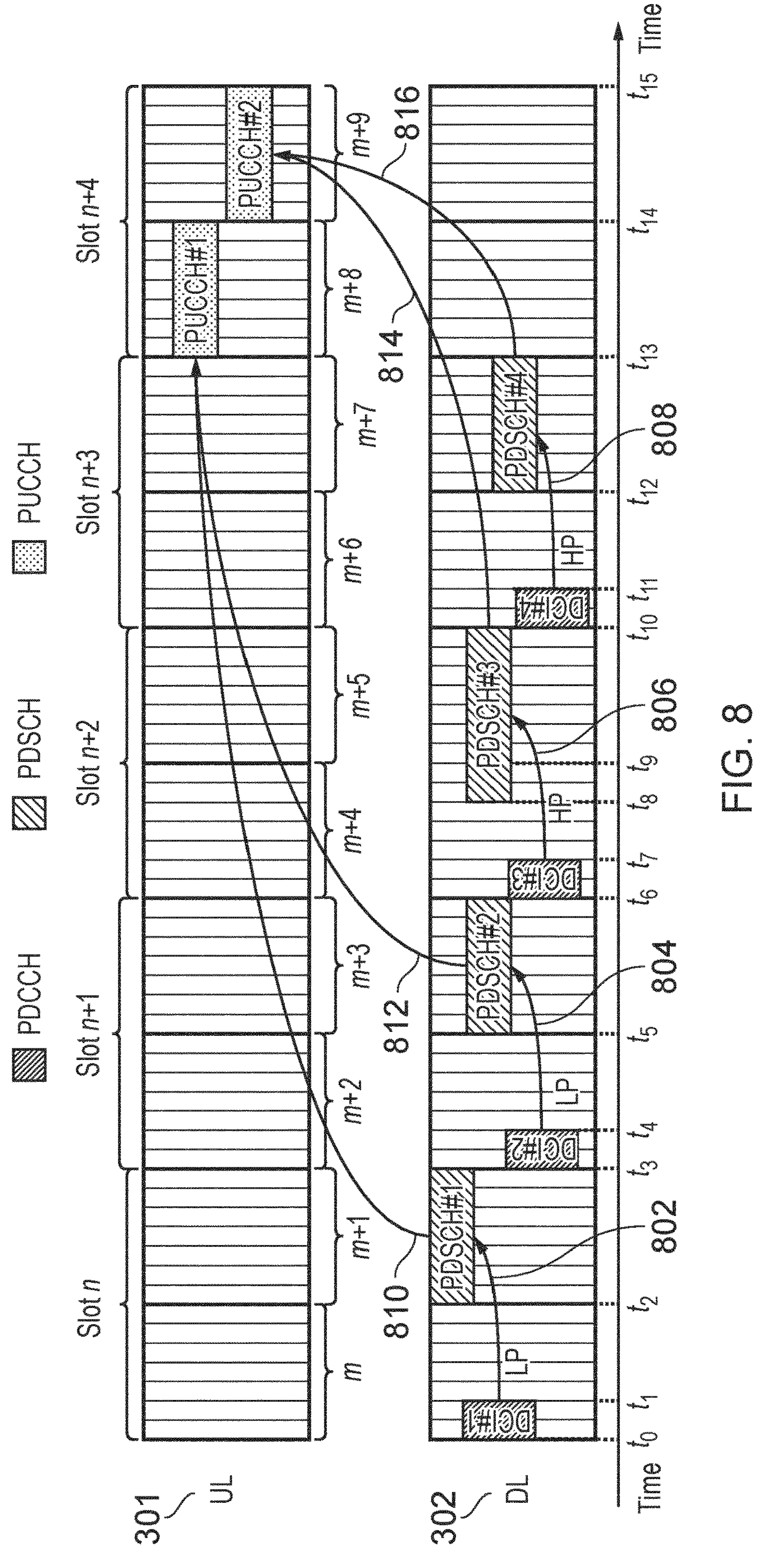
FIG. 8 is an illustrative representation of communications resources in time and frequency for uplink and downlink channels of a time divided wireless access interface in which an example of two HARQ-ACK codebooks of different priorities is shown.

In FIG. 8, the communications device 4, 14 receives first DCI labelled "DCI #1" which, as represented by arrow 802, indicates an allocation of communications resources for transmitting a first physical downlink shared channel labelled "PDSCH #1". As represented by arrow 810, DCI #1 indicates a first physical uplink control channel labelled "PUCCH #1" in sub-slot m+8 for transmitting a HARQ-ACK in respect of PDSCH #1. As shown in FIG. 8, the HARQ-ACK for PDSCH #1 is a low L1 priority HARQ-ACK. The communications device 4, 14 receives a second DCI labelled "DCI #2" which, as represented by arrow 804, indicates an allocation of communications resources for transmitting a second physical downlink shared channel labelled "PDSCH #2". As represented by arrow 812, DCI #2 indicates PUCCH #1 in sub-slot m+8 for transmitting a HARQ-ACK in respect of PDSCH #2. As shown in FIG. 8, the HARQ-ACK for PDSCH #2 is a low L1 priority HARQ-ACK. The communications device (UE) 4, 14 receives third DCI labelled "DCI #3" which, as represented by arrow 806, indicates an allocation of communications resources for transmitting a third physical downlink shared channel labelled "PDSCH #3". As represented by arrow 814. DCI #3 indicates a second physical uplink control channel labelled "PUCCH #2" in sub-slot m+9 for transmitting a HARQ-ACK in respect of PDSCH #3. As shown in FIG. 8, the HARQ-ACK for PDSCH #3 is a high L1 priority HARQ-ACK. The communications device 4, 14 receives fourth DCI labelled "DCI #4" which, as represented by arrow 808, indicates an allocation of communications resources for transmitting a fourth physical downlink shared channel labelled "PDSCH #4". As represented by arrow 816. DCI #4 indicates PUCCH #2 in sub-slot m+9 for transmitting a HARQ-ACK in respect of PDSCH #4. As shown in FIG. 8, the HARQ-ACK for PDSCH #4 is a high L1 priority HARQ-ACK.

The PUCCH #1 in sub-slot m+8 carries a low L1 priority HARQ-ACK codebook to multiplex the HARQ-ACKs for PDSCH #1 and PDSCH #2. The PUCCH #2 in sub-slot m+9 carries a high L1 priority HARQ-ACK codebook to multiplex the HARQ-ACKs for PDSCH #3 and PDSCH #4. Therefore, different PUCCH transmissions that have different reliabilities can be configured to carry HARQ-ACKs with different L1 priorities.

In order to provide different reliability for different L1 priority PUCCH, the PUCCH Resources can be separately configured for different L1 priority. That is the PRI field in a DL Grant scheduling a LP PUCCH refers to a PUCCH Resource Set containing different PUCCH Resources to those of a HP PUCCH.

PUCCH Resource Determination

As mentioned above. Uplink Control Information (UCI) is typically carried by the Physical Uplink Control Channel (PUCCH), where the PUCCH time and frequency resource used is determined using a number of UCI information bits $N_{UCI}$.

There are four PUCCH Resource Sets, where each PUCCH Resource Set has a maximum limit on the number of UCI information bits that it can carry and can be configured with certain PUCCH Formats as shown in Table 1 below. The values $N_2$ and $N_3$ are RRC configurable via the parameter maxPayloadMinus1 which can have a value 4 to 256 bits, where $N_3>N_2$. There are five PUCCH formats {0, 1, 2, 3, 4} and the PUCCH resource in PUCCH Resource Set ID 0 can only use PUCCH Format 0 and 1 whilst the other sets can only use PUCCH Format 2, 3 and 4.

TABLE 1

| PUCCH Resource Set | | | |
|---|---|---|---|
| Set ID | Number of PUCCH Resources | Maximum UCI Bits | PUCCH Format |
| 0 | 8 to 32 (configurable) | 3 (2 bits + SR) | Format 0 & 1 |
| 1 | 8 | $N_2$ (configurable) | Format 2, 3 & 4 |
| 2 | 8 | $N_3$ (configurable) | Format 2, 3 & 4 |
| 3 | 8 | 1706 | Format 2, 3 & 4 |

The UE firstly selects a PUCCH Resource Set based on the number of UCI information bits $N_{UCI}$ that needs to be carried by the PUCCH as follows:

- If $N_{UCI}\leq 2$ bits and the UCI is HARQ-ACK and/or SR then select PUCCH Resource Set ID 0 (note: PUCCH Format 0 is capable of carrying 2 HARQ-ACK+1 SR, i.e. effectively 3 bits).
- If 2 bits$<N_{UCI}\leq N_2$, then select PUCCH Resource Set ID 1
- If $N_2<N_{UCI}\leq N_3$, then select PUCCH Resource Set ID 2
- If $N_3<N_{UCI}\leq 1706$ bits, then select PUCCH Resource Set ID 3

Once the PUCCH Resource Set is selected, the UE selects a PUCCH Resource in that set. There are at least eight PUCCH Resources in each PUCCH Resource Set and for HARQ-ACK the PUCCH Resource is indicated in the PRI field of the DL Grant as described above.

A selected PUCCH Resource determines the time resource, e.g. starting symbol in a slot and the duration of the PUCCH. The frequency resource, i.e. number of PRBs up to a pre-configured maximum PRB, used to carry the PUCCH is determined after encoding the UCI bits using a pre-configured code rate.

The PUCCH Resource and PUCCH Resource Set are configured under the RRC Information Element (IE) PUCCH-Config. In 3GPP Rel-16, there are two PUCCH-Config configurations, a first PUCCH-Config for Low L1 Priority PUCCH (or Rel-15 operation) and second PUCCH-Config for High L1 Priority PUCCH. Hence, if the UE supports L1 priority, the UE would have 4×2 PUCCH Resource Sets where 4 PUCCH Resource Sets are configured under the first PUCCH-Config for LP PUCCH and another 4 PUCCH Resource Sets are configured under the second PUCCH-Config for HP PUCCH.

In Time Division Duplexing (TDD), a PUCCH for SPS PDSCH can also be cancelled if it collides with downlink symbols or invalid symbols.

Multiplexing of UCI with Different L1 Priorities

As described above with reference to FIG. 8, prioritization is used to handle intra-UE UL collisions where the Low L1 Priority (LP) PUCCH is dropped when it collides with a High L1 Priority (HP) PUCCH. A PUCCH typically carries HARQ-ACKs for multiple PDSCHs and hence when a PUCCH is dropped due to prioritization, the corresponding PDSCHs may be retransmitted which can consume downlink resources unnecessarily. Recognizing this, in Rel-17, multiplexing of UCIs with different L1 priorities is introduced to avoid dropping of LP HARQ-ACKs.

In this feature, when LP PUCCH and HP PUCCH collide, the HARQ-ACKs from the LP PUCCH can be multiplexed into a HP PUCCH resource. The LP HARQ-ACKs and HP HARQ-ACKs are separately encoded where different coding rates are applied. The multiplexed UCIs are carried by a PUCCH resource selected from a PUCCH Resource Set configured for HP PUCCH (i.e. the second PUCCH-Config). This is to ensure that the selected PUCCH meets the URLLC reliability requirement.

For PUCCH collision with a PUSCH, the HARQ-ACKs in the PUCCH is multiplexed into the PUSCH, in this scenario, where the PUSCH can be HP or LP, that is:

- A LP HARQ-ACK from a LP PUCCH multiplexes into a HP PUSCH.
- A HP HARQ-ACK from a HP PUCCH multiplexes into a LP PUSCH When intra-UE UL transmissions of different L1 priorities collide, whether to perform multiplexing (Rel-17) or prioritization (Rel-16) can be indicated by the gNB. For example, this can be RRC configured and/or dynamically indicated in the DCI. Some potential multiplexing indicator methods are disclosed in our co-pending European patent application number EP 20155210.6 [7].

SPS HARQ-ACK Deferral

In addition to intra-UE prioritization, a PUCCH carrying HARQ-ACK can also be dropped for other reasons, such as for example, when it overlaps with DL symbols or Invalid symbols (i.e. symbols marked as being invalid by the network) in a TDD operation. In Dynamic Grant PDSCH, the gNB has the flexibility to schedule its PUCCH to avoid DL symbols or Invalid symbols. However, since $K_1$ is fixed after a SPS PDSCH is activated, it is difficult for the gNB to avoid such collisions. SPS PDSCH is therefore an example of a pre-configured resource. It is observed that for short SPS PDSCH periodicity, such collisions would occur more often, and this would lead to excessive droppings of PUCCHs and unnecessary PDSCH retransmissions. Hence, in Rel-17, as part of HARQ-ACK enhancement, SPS HARQ-ACK deferral is introduced.

Figure 9:
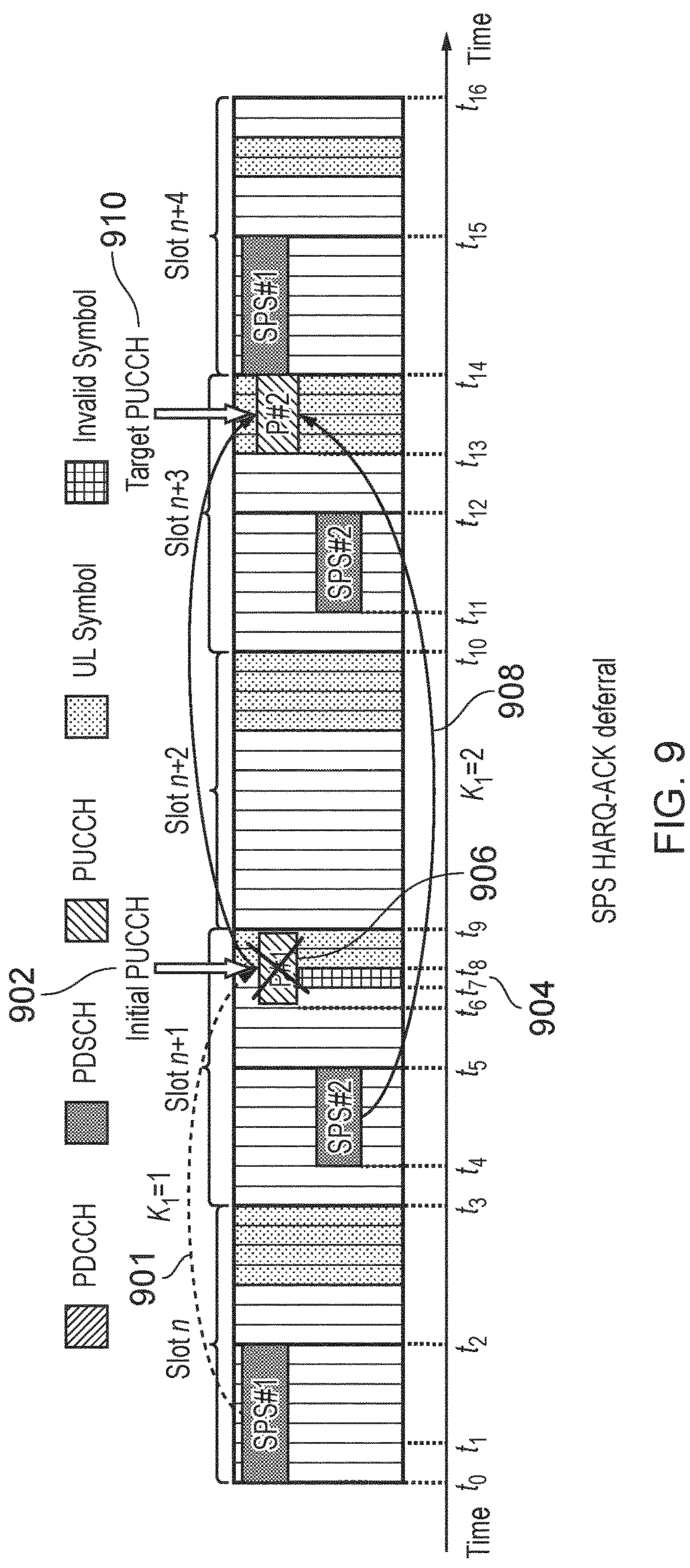
FIG. 9 is an illustrative representation of communications resources in time on a frequency channel formed from OFDM symbols, which provided both uplink and downlink channels of a time division duplex wireless access interface in which a plurality of SPS channels are configured and PUCCH channels are configured for communicating HARQ-ACKs.

In SPS HARQ-ACK deferral, when a PUCCH carrying HARQ-ACK for an SPS is dropped and the HARQ-ACK cannot be multiplexed into a dynamically scheduled PUCCH (by a DL Grant), the SPS HARQ-ACK can be deferred to the next available valid PUCCH. The PUCCH carrying the SPS HARQ-ACK that is dropped is known as the "initial PUCCH" and the PUCCH carrying the deferred SPS HARQ-ACK is known as the "target PUCCH". The slot or sub-slot where the initial PUCCH resides is known as the "initial slot" or "initial sub-slot". Similarly, the slot or sub-slot where the target PUCCH resides is known as the "target slot" or "target sub-slot". An example is shown in FIG. 9, where SPS #1 and SPS #2 are configured with periodicity of 4 slots and 2 slots respectively, and so SPS #1 occurs in time slot n and n+4 and SPS #2 occurs in time-slots n+1 and n+3. SPS #1 and SPS #2 are activated with $K_1=1$ and $K_1=2$ respectively. In Slot n, SPS #1 is received by the UE and the corresponding PUCCH, labelled as P #1, carrying its HARQ-ACK is scheduled in Slot n+1 (since its $K_1=1$) as represented by an arrow with a dashed line 901. However, P #1, which would have been transmitted in an initial PUCCH 902, overlaps with an Invalid symbol or DL symbol 904 and therefore is dropped and so the HARQ-ACK is deferred. The dropped PUCCH carrying the HARQ-ACK P #1 is represented by a "X" 906. In Slot n+1. SPS #2 is received with a corresponding PUCCH, labelled as P #2, carrying its HARQ-ACK scheduled in Slot n+3 (since its $K_1=2$) as represented by an arrow with a solid line 908. P #2 can be transmitted since it does not overlap with any DL symbol or Invalid symbol. The deferred SPS #1's HARQ-ACK from P #1 is multiplexed with the SPS #2's HARQ-ACK and they are both transmitted in the PUCCH P #2 as represented by an arrow with a solid line 908. P #1 in this example is the initial PUCCH 902 and P #2 is the target PUCCH 910. Slot n+1 where P #1 resides is the initial slot and Slot n+3 where P #2 resides is the target slot.

Technical Problem

According to some proposals HP SPS HARQ-ACK and LP SPS HARQ-ACK are deferred separately, such that their target PUCCHs have the same L1 priority. That is. HP SPS HARQ-ACK is deferred to a target PUCCH with High L1 priority and similarly LP SPS HARQ-ACK is deferred to a target PUCCH with Low L1 priority. This can result in increased latency and/or an inefficient use of communications resources if the UE has to wait to transmit the HARQ-ACK for SPS with the same physical layer priority and may also lead to greater number of retransmissions.

Example embodiments can provide a method of operating a communications device (UE) to receive data from a wireless communications network, the method comprising receiving a plurality of downlink PDSCH transmissions in communications resources of a wireless access interface provided by the wireless communications network which are divided in time into a plurality of time divided units. Each of the plurality of downlink PDSCH transmissions is a transmission of a data unit according to a different Hybrid Automatic Repeat Request, HARQ, process and one or more of the downlink transmissions is in pre-configured communications resources of the PDSCH. For example, the pre-configured communications resources may be SPS downlink transmissions The method comprises determining a HARQ acknowledgement or negative acknowledgement (HARQ- ACK) for each of the plurality of received downlink PDSCH transmissions in accordance with whether the data unit for the HARQ process was correctly received or not, identifying for each of the HARQ-ACKs one of a plurality of different physical layer priorities (L1 priorities) for transmitting the HARQ-ACK, and identifying target uplink communications resource, of one of the plurality of time divided units of the wireless access interface after the plurality of downlink PDSCH transmissions in which one or more of the HARQ-ARKs can be transmitted for one of the plurality of the downlink transmissions, such as for example a PUCCH, as a first transmission of the HARQ-ACK for the received downlink transmission in the target uplink communications resource. The method further comprises determining whether the HARQ-ACK for one or more others of the plurality of the downlink transmissions can be multiplexed with the HARQ-ACK being transmitted as a first transmission of the HARQ-ACK for the received downlink PDSCH transmission which can be transmitted in the target uplink communications resource as uplink control information (UCI), and transmitting the UCI in the target uplink communications resource (PUCCH) comprising the HARQ-ACK being transmitted as a first transmission of the HARQ-ACK multiplexed with the HARQ-ACK for the one or more others of the plurality of the downlink transmissions. According to example embodiments, the determining, by the UE, whether the HARQ-ACK for the one or more others of the plurality of the downlink PDSCH transmissions can be multiplexed with the HARQ-ACK being transmitted as a first transmission of the HARQ-ACK for the downlink PDSCH transmission which can be transmitted is based on a combination of the identified uplink physical layer priority for transmitting the HARQ-ACK for the one or more others of the plurality of the downlink transmissions and the HARQ-ACK being transmitted as a first transmission, and a multiplex (Mux) indicator for one or both of the target uplink communications resource for transmitting the uplink control information and each of the plurality of downlink transmissions. That is to say that according to example embodiments. each of the plurality of downlink transmissions may be provided with a Mux indicator to indicate whether or not a corresponding HARQ-ACK can be multiplexed with other HARQ-ACKs of different L1 priority for transmission in the uplink communications resources (PUCCH), and/or a Mux indicator may be provided for the target PUCCH, that is to say the target uplink communications resource for transmitting the UCI may be provided with a Mux indicator. The UE then determines whether or not to multiplex other HARQ-ACKs of different L1 priority into a HARQ-ACK which can be transmitted in the uplink communications resource based on a combination of the L1 priority (high-priority or low priority) and the Mux indicator for one or both of the PDSCH transmission and the PUCCH transmission. Example embodiments provided below illustrate both of these scenarios.

Example embodiments can therefore provide a HARQ-ACK deferral of different L1 priorities in the same PUCCH.

Example embodiments can provide a method for multiplexing of HARQ-ACK deferral of different L1 priority, when UCI multiplexing of different L1 priority is enabled. Example embodiments can determine whether to perform multiplexing of deferred HARQ-ACK of different L1 priorities into a target PUCCH based upon a combination of different configurations for multiplexing of different L1 priorities of deferred HARQ-ACKs and target PUCCHs. According to example embodiments, the communications device (UE) identifies target uplink communications resources such as a PUCCH in which a first transmission of a HARQ-ACK can be made following receipt of a downlink PDSCH transmission. The first transmission of HARQ-ACK is the HARQ-ACK scheduled for the first time to be transmitted in the target PUCCH. There can be one or more first transmission of HARQ-ACKs as the target PUCCH can multiplex multiple HARQ-ACKs from multiple PDSCHs in "PUCCH #2" in FIG. 5 and FIG. 7. Having identified the target uplink communications resource, the communications device then identifies whether other HARQ-ACK's from other received downlink PDSCH transmissions can be multiplexed into that target uplink resource based on a Mux indicator status of the target uplink communications resource, the downlink PDSCH transmissions and the L1 priority for transmitting the HARQ-ACKs. According to this arrangement, embodiments can provide multiplexing of HARQ-ACK's of different L1 priorities into the same target communications resource as a PUCCH/PUSCH. The multiplexing may include HARQ-ACK's which are deferred for SPS PDSCH transmissions which cannot be made as a first or initial transmission in allocated or initial uplink communications resource but then can be multiplexed into a target uplink communications resource for a downlink PDSCH transmission for which a first transmission can made for the HARQ-ACK.

Multiplexing of different L1 priorities configuration for a PUCCH or PUSCH is referred to in the following description as "Multiplexing Indicator" or "Mux Indicator" as described in our co-pending European patent application EP 20155210.6 [7], the content of which is incorporated herein by reference in its entirety. As described in [7], the Mux Indicator can be set to enabled or disabled via RRC configuration or dynamic indicator in the DCI. For SPS, the Mux Indicator can be configured individually using RRC configuration or dynamically via the activation DCI.

Figure 10:
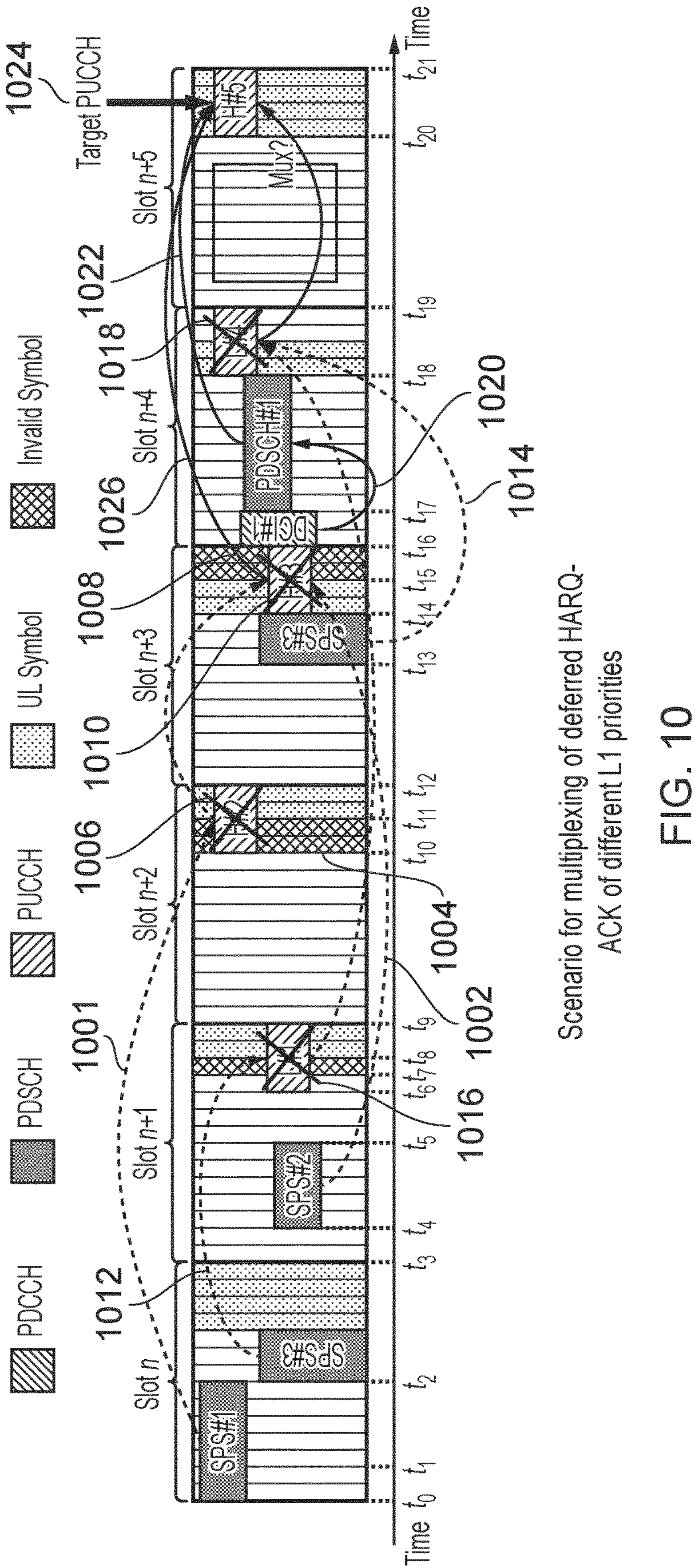
FIG. 10 is an illustrative representation of communications resources in time on a frequency channel formed from OFDM symbols of FIG. 9 according to embodiments of the present technique in which deferred HARQ-ACK's are multiplexed into a PUCCH with different L1 priorities.

The combination involves one or more accumulated deferred LP SPS HARQ-ACKs, one or more accumulated deferred HP SPS HARQ-ACKs and a target PUCCH. An example scenario is shown in FIG. 10, where SPS #1 and SPS #2 are activated with HP HARQ-ACK and $K_1=2$ slots whilst SPS #3 is activated with LP HARQ-ACK and $K_1=1$ slot. As shown in FIG. 10, for SPS #1 and SPS #2, with $K_1=2$ slots, PUCCH is indicated in slots n+2 and n+3 respectively as represented by arrows with a dashed line 1001, 1002. The first instance of SPS #1 in Slot n has a corresponding high priority (HP) PUCCH H #2 in Slot n+2 where H #2 is dropped due to collision with invalid symbols 1004 as represented by "X" 1006. SPS #2 in Slot n+1 has a corresponding HP PUCCH in Slot n+3 (H #3), which is also dropped due to collision with invalid symbols 1008 as represented by "X" 1010. Consequently, the HARQ-ACKs for SPS #1 and SPS #2 are accumulated and deferred to a target PUCCH.

For the two occasions of the SPS #3 in Slot n and Slot n+3, with $K_1=1$ slot, the PUCCH is indicated in slots n+1 and n+4 respectively as represented by arrows with a dashed line 1012, 1014. The HARQ-ACKs have a Low Priority (LP) PUCCH L #1 and L #4 respectively, which are dropped due to collision with invalid symbols or DL symbols, as represented by "X" 1016, 1018. Consequently, their HARQ-ACKs are accumulated and deferred to a target PUCCH.

At time $t_{17}$ in Slot n+4. DCI #1 schedules PDSCH #1, represented by an arrow with a solid line 1020 and its HARQ-ACK is transmitted in HP PUCCH H #5, represented by an arrow with a solid line 1022. Since the deferred HARQ-ACKs from H #2 and H #3 are High L1 priority (HP). H #5 therefore acts as the target PUCCH 1024 for them and the deferred HP HARQ-ACKs are multiplexed into H #5 as represented by an arrow with a solid line 1026. According to this example embodiment, whether the accumulated LP HARQ-ACKs L #1 and L #4 from the two instances of SPS #3 can be multiplexed into the target PUCCH H #5, which has a different L1 priority (HP) to that carried by the target PUCCH, depends on a combination of a Mux Indicator status (enabled/disabled) for the HARQ-ACKs of SPS #1, SPS #2, SPS #3 and PDSCH #1.

As we will be explained below, whether a HARQ-ACK with a different L1 priority can be multiplexed can depend upon a Mux Indicator status for either the initial PUCCH for originally configured PDSCH transmission and/or the PDSCH transmission for the target PUCCH.

It should be noted that the target PUCCH may be multiplexed into a PUSCH. That is to say the deferred HARQ-ACKs can be transmitted via a PUSCH instead of a PUCCH in the target slot.

Mux Indicator Enabled

Figure 11:
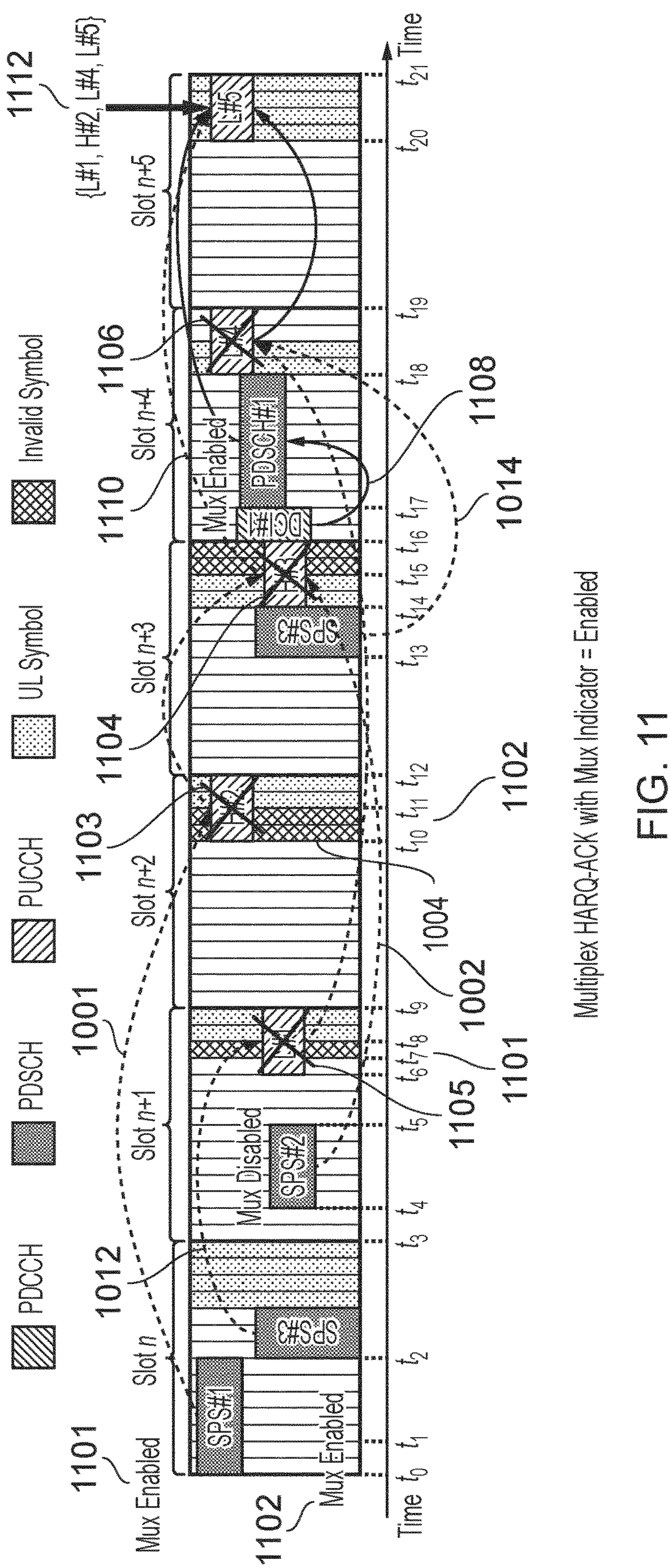
FIG. 11 is an illustrative representation of communications resources in time on a frequency channel formed from OFDM symbols of FIG. 9 according to other example embodiments of the present technique in which deferred HARQ-ACK's are multiplexed into a PUCCH with different Mux indicators.

In an example embodiment, HARQ-ACKs, including that for the target PUCCH, that have Mux Indicator set to enabled can be multiplexed together. Here, deferred HARQ-ACK of a different L1 priority that has Mux Indicator=Disabled will not be multiplexed into a target PUCCH. An example is shown in FIG. 11, which corresponds to the example shown in the FIG. 10 and so the differences will be described. In FIG. 11, SPS #1 and SPS #2 have HP HARQ-ACK with their corresponding PUCCH H #2 and H #3 dropped due to collision with DL or invalid symbols 1101, 1102, as represented by "X" 1103, 1104. Consequently, their HP HARQ-ACKs are accumulated and deferred to a target PUCCH. SPS #3 HARQ-ACK is LP and the LP PUCCHs for SPS #3 instances L #1, L #4 in Slot n+1 and Slot n+4 are dropped as represented by "X" 1105, 1106 and consequently their HARQ-ACKs are accumulated and deferred.

In time slot n+4, a DCI #1 schedules PDSCH #1 where its HARQ-ACK is transmitted in LP PUCCH L #5 in Slot n+5, as represented by an arrow with a solid line 1108. Since deferred HARQ-ACK from L #1 and L #4 are Low L1 priority (LP), which is the same as that of L #5, they can be multiplexed together in the transmission for L #5. The HARQ-ACKs for SPS #1, SPS #3 and PDSCH #1 have Mux Indicator Enabled whilst the HARQ-ACK for SPS #2 has Mux Indicator Disabled. According to this example embodiment. those PDSCH transmissions with Mux Indicator set to Enabled can be multiplexed together and hence deferred HARQ-ACKs from L #1, H #2 and L #4 are multiplexed together with the HARQ-ACK for PDSCH #1. The deferred HARQ-ACK from H #3 is not multiplexed into PUCCH L #5 as represented by an arrow with a dashed line 1110.

In another embodiment, HARQ-ACK multiplexing of different L1 priorities is only performed if all the Mux Indicator for HP HARQ-ACK is Enabled. In this embodiment the Mux Indicator for LP HARQ-ACK is not utilized, i.e. ignored. If any of the deferred HP HARQ-ACK has Mux Indicator set to Disabled then the deferred HARQ-ACKs of different priorities would have different target PUCCHs.

As will be appreciated from the above explanation, the Mux Indicator is only relevant for HARQ-ACK multiplexing of different L1 priorities. Multiplexing of the same priority is handled without the need of the Mux Indicator.

Mux Indicator of Target PUCCH

In another embodiment, the UE can determine whether or not it can multiplex deferred HARQ-ACK's of different L1 priorities into an identified target PUCCH depending on a status of the identified target PUCCH. This is in contrast to the embodiments described with reference to FIG. 11 in which a UE determines whether deferred HARQ-ACK's can be multiplexed into a target PDCCH is dependent upon a Mux indicator status of the PDSCH transmission. According to example embodiments in which the UE determines whether or not it can multiplex deferred HARQ-ACK's into a target PUCCH depending upon a status of the target PUCCH, gNB can determine whether the target PUCCH is suitable (e.g. sufficient resources) to carry HARQ-ACKs of different L1 priorities. Furthermore, the gNB may have already scheduled retransmissions for some of the SPSs with deferred HARQ-ACKs with different L1 priority to the target PUCCH and so may decide not to multiplex further deferred HARQ-ACKs into the target PUCCH.

Figure 12:
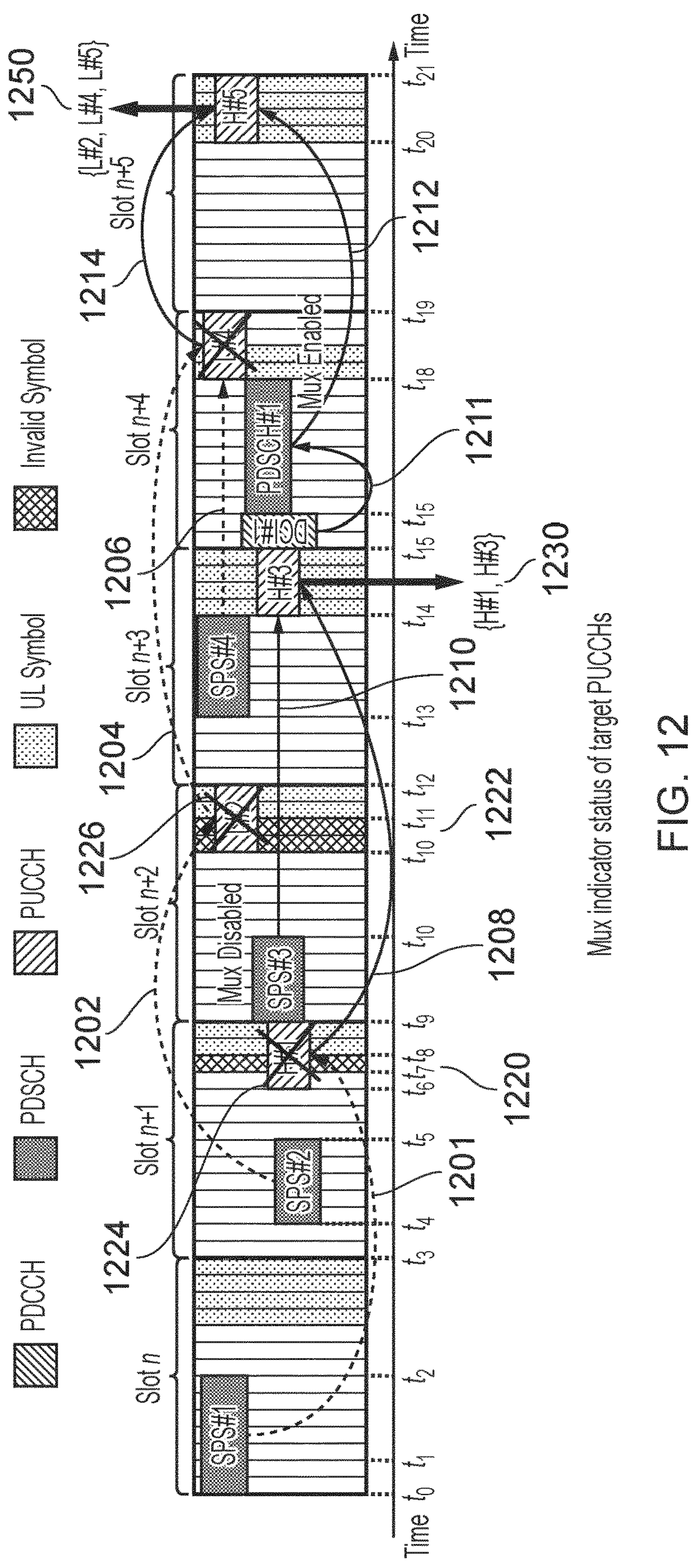
FIG. 12 is an illustrative representation of communications resources in time on a frequency channel formed from OFDM symbols of FIG. 9 according to other example embodiments of the present technique in which deferred HARQ-ACK's are multiplexed into a PUCCH depending on a status of a target PUCCH.

In another embodiment, the status of the target PUCCH is a Multiplexing Indicator status. That is the target PUCCH determines whether deferred HARQ-ACK from a different L1 priority can be multiplexed with other deferred HARQ-ACKs depends on the Mux indicator status of the target PUCCH. In this embodiment, the Mux Indicator determines whether the PUCCH (in this case the target PUCCH) allows multiplexing of UCI with a different L1 priority, which is independent of the Mux Indicator status of the dropped PUCCHs. An example embodiment is shown in FIG. 12, which illustrates an example in which four downlink channels carry downlink data in four semi-persistent scheduled (SPS) PDSCH resources, SPS #1, SPS #2, SPS #3, SPS #4. The HARQ-ACKs for SPS #1, SPS #2, SPS #3 and SPS #4 are scheduled to PUCCH H #1, L #2, H #3 and L #4 respectively. H #1 and H #3 are HP PUCCH whilst L #2 and L #4 are LP PUCCH. The $K_1$ indicator identifying a slot and resources of a PUCCH for transmitting UCI containing HARQ-ACK's according to L1 priorities are represented by arrows which have either a dashed line 1201, 1202, 1204, 1206 or a solid line 1208, 1210, 1212, 1214, As shown in FIG. 12, HARQ-ACK transmissions for SPS #1 and SPS #2 cannot be transmitted in their respective PUCCHs because they collide with invalid or downlink symbols 1220, 1222. These transmissions are therefore deferred as represented by an "X" 1224, 1226 and so transmission of an initial PUCCH is deferred as represented by the arrows with dashed lines 1201, 1202. PUCCH H #1 and L #2 are therefore dropped due to collision with DL and invalid symbols 1220, 1222 and hence their HARQ-ACKs are deferred. HP PUCCH H #3 is not dropped, as represented by the solid line 1210 and therefore acts as a target PUCCH 1230. SPS #3 is configured with Mux Indicator=Disabled and so it can only multiplex HARQ-ACK of the same L1 priority and as per this embodiment, the deferred HARQ-ACK from H #1 is multiplexed into H #3 and transmitted, whilst L #2 is further deferred to another suitable target PUCCH as represented by the arrow with a dashed line 1204. In Slot n+3, SPS #4 is transmitted by the gNB where its HARQ-ACK is scheduled in LP PUCCH L #4 ins Slot n+4. L #4 collides with DL symbols and hence it is dropped and the HARQ-ACK for SPS #4 is therefore deferred. In Slot n+4, a DCI #1 schedules PDSCH #1, as represented by an arrow with a solid line 1211, where a corresponding HARQ-ACK is transmitted in a HP PUCCH H #5, as represented by the arrow with a solid line 1212. The Mux Indicator of the target PUCCH for carrying H #5 is Enabled (e.g. via RRC configuration or dynamically indicated in DCI #1) and so it acts as a target PUCCH for the deferred HARQ-ACKs from the drop L #2 and L #4, as represented by the arrow with the solid line 1214, which have different L1 priority to that of H #5. Therefore, the HARQ-ACKs from L #2 and L #4 are multiplex with that in H #5 and transmitted in the target PUCCH 1250.

In another embodiment, the status of the target PUCCH is the L1 priority of the PUCCH and the Multiplexing Indicator status. If the L1 priority is high priority, and the Mux Indicator is Enabled. That is only HP PUCCH can be used as a target PUCCH to multiplex deferred HARQ-ACKs of different L1 priorities, when its Mux Indicator is set to Enabled.

Low L1 Priority Target PUCCH

In another embodiment, if the target PUCCH has a Low L1 priority and Mux Indicator is Enabled, then if the deferred HARQ-ACKs contains HP HARQ-ACKs, the UE would select a PUCCH from a PUCCH Resource Set configured for High L1 Priority, so that the PUCCH Resource Set configured under the second PUCCH-Config RRC information element (IE) as described above for the multiplexing of the deferred HP HARQ-ACK and the non-deferred (scheduled for the target LP PUCCH) and if present the deferred LP HARQ-ACK. As described explained above (PUCCH Resource Determination), in a collision between LP PUCCH and HP PUCCH, the multiplexed UCIs are carried by a PUCCH selected from the PUCCH Resource Set configured for HP PUCCH. However, for HARQ-ACK deferral there may not be any collision for the LP target PUCCH and so to ensure the reliability for the HP HARQ-ACKs are maintained, the UE would select a PUCCH from the PUCCH Resource Set configured for HP PUCCH even though the target PUCCH is LP and there is no HP PUCCH in the target slot/sub-slot.

Non-Deferred SPS HARQ-ACK

The embodiments described above can also be applied to non-deferred SPS HARQ-ACKs for the purpose of HARQ-ACKs multiplexing of different L1 priorities among multiple SPS and/or dynamic PUCCH/PUSCH.

Figure 13:
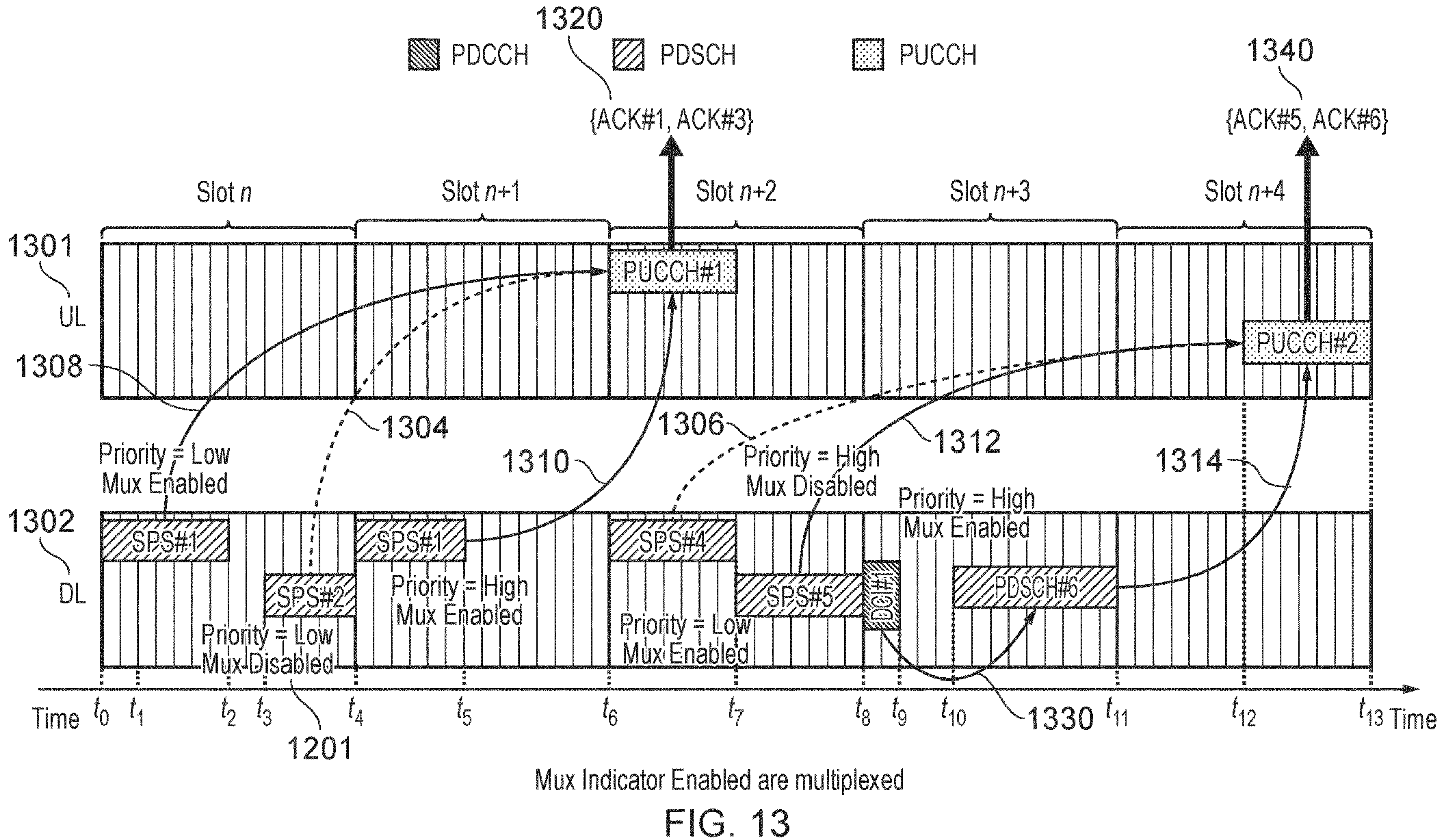
FIG. 13 is an illustrative representation of communications resources in time and frequency in which an uplink and downlink of the wireless access interface are formed in separate frequency channels in accordance with frequency division duplex and HARQ-ACKs from different downlink transmissions are multiplexed into a PUCCH depending on a Mux indicator status of the PUCCH according to example embodiments.

According to an example embodiment, SPS HARQ-ACKs, dynamically scheduled PUCCH and PUSCH that have Mux Indicator Enabled can perform UCI multiplexing of different L1 priorities. An example embodiment is shown FIG. 13. As shown in FIG. 13 six downlink channels are carried by five semi-persistent scheduled (SPS) PDSCH resources, and a dynamically granted transmission PDSCH #6, which is a scheduled dynamic grant by DCI #1. For the example shown in FIG. 13, frequency division duplex (FDD) scenario is considered in which a wireless access interface provides separate uplink 1301 and downlink 1302 frequency channels. According to this example, PUCCH resources were not being dropped due to collision with DL or invalid symbols such as with the TDD example explained with reference to FIGS. 10 to 12. As for the previously described embodiments, PUCCH resources of the UL which are configured to carry UCI information providing HARQ-ACKs for the respective PDSCH transmissions are indicated by arrows with dashed lines 1304, 1306 and solid lines 1308, 1310, 1312, 1314, Although FIG. 13 represents an FDD scenario, the example embodiments are applicable to TDD scenarios.

As shown in FIG. 13 SPS #1, SPS #2 and SPS #3 have their HARQ-ACK scheduled in Slot n+2 as represented by the arrows 1304, 1308, 1310. SPS #1 and SPS #2 have LP HARQ-ACK whilst SPS #3 has HP HARQ-ACK and since their HARQ-ACKs collide, multiplexing or prioritization is performed so that their HARQ-ACKs are transmitted in PUCCH #1. SPS #1 and SPS #3 have their Mux Indicator set to Enabled whilst SPS #2 is set to Disabled. As per this embodiment the HARQ-ACK for SPS #2 is not multiplexed into PUCCH #1 as represented by the arrow with a dashed line 1304, and PUCCH #1 carries HARQ-ACK for SPS #1 and SPS #3, as represented by the arrows with the solid line 1308, 1310, which are labelled as {ACK #1, ACK #3} respectively in the target PUCCH transmission 1320. In Slot n+2, SPS #4 and SPS #5 are received by the UE and their HARQ-ACKs are scheduled in Slot n+4 causing a collision. In Slot n+3, DCI #1 schedules PDSCH #6, as represented by an arrow the solid line 1330, where its HARQ-ACK is also scheduled in Slot n+4 and carried by PUCCH #2, as represented by the arrow the solid line 1314. SPS #4 and PDSCH #6 have HP HARQ-ACK whilst SPS #5 has LP HARQ-ACK. Since the Mux Indicator for SPS #5 and PDSCH #6 are Enabled whilst that for SPS #4 is Disabled, PUCCH #2 carries the HARQ-ACK for SPS #5 and PDSCH #6, as represented by the arrows with the solid lines 1312, 1314 which are labelled as {ACK #5. ACK #6} respectively for the target PUCCH transmission 1340. In contrast since SPS #4 carrying an HP HARQ-ACK has Mux indicator disabled, the HARQ-ACK cannot be carried by the PDCCH #2 as represented by the arrow with the dashed line 1306.

Figure 14:
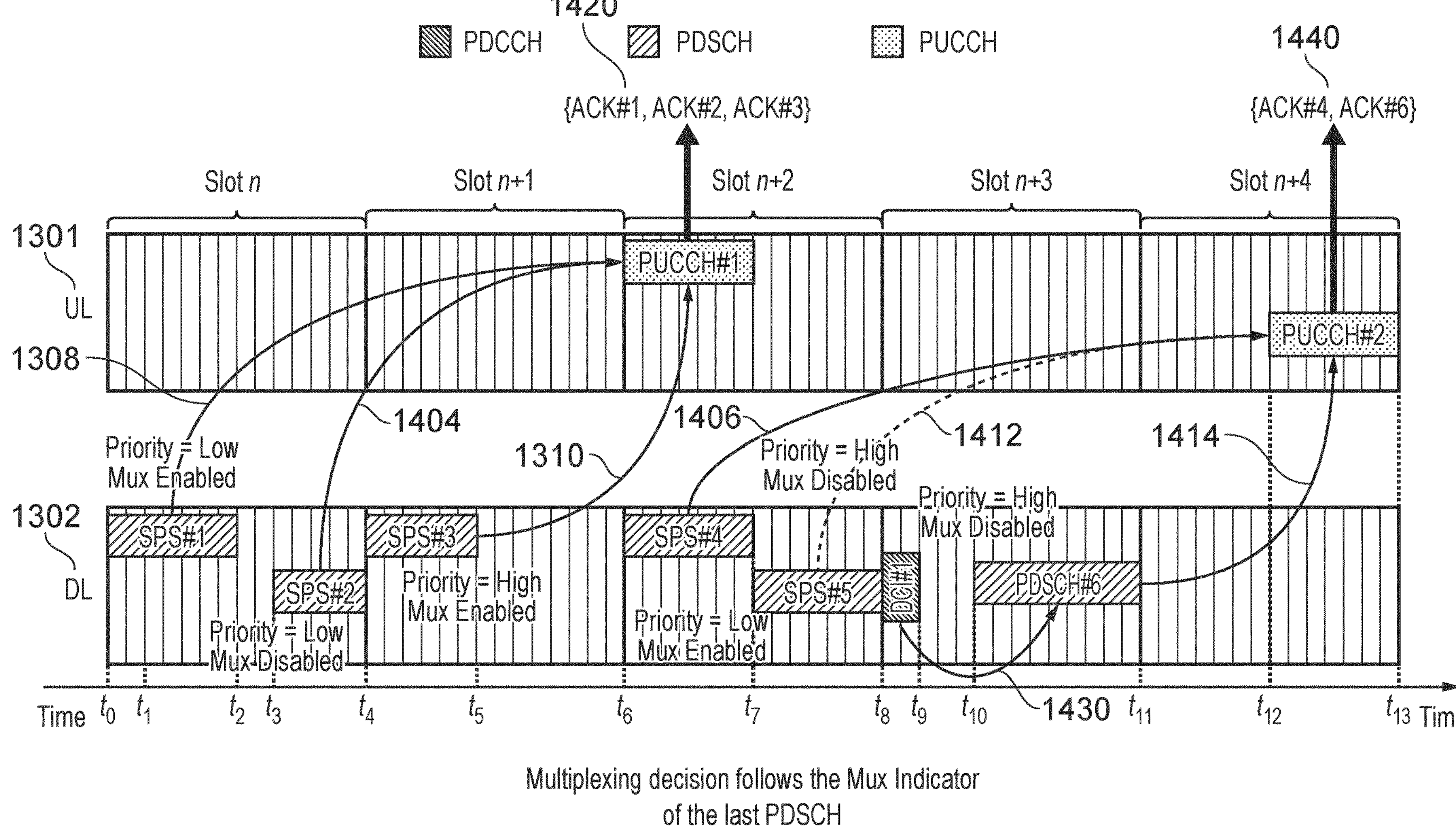
FIG. 14 is an illustrative representation of communications resources in time and frequency in which an uplink and downlink of the wireless access interface are formed in separate frequency channels as for FIG. 13 in which HARQ-ACK's are multiplexed into PUCCH in accordance with a Mux indicator status of the last PDSCH to be transmitted according to example embodiments.

In another embodiment, a UE can determine whether a PUCCH can carry HARQ-ACK's of different L1 priorities based on the last PDSCH (SPS or dynamically scheduled PDSCH) prior to the HARQ-ACK transmissions for multiple SPS/PDSCHs. The UE determines whether to multiplex UCI of different L1 priority or not based on a priority of the HARQ-ACK of the last PDSCH to be transmitted. As will be recalled. UCI multiplexing of same priority is always performed. An example embodiment is shown in FIG. 14, which has the same scenario as that in FIG. 13, with the exception that Mux Indicator is Disabled for the HARQ-ACK of PDSCH #6, which is indicated in the DCI #1. Since the example embodiments illustrated by FIG. 14 corresponds to the same scenario as that described above for the embodiment shown in FIG. 13, corresponding reference numerals have been used and only differences with embodiment of FIG. 14 will be described. The HARQ-ACKs for SPS #1, SPS #2 and SPS #3 are scheduled in Slot n+2, which is carried by PUCCH #1 as for the example of FIG. 13. Since SPS #3 is the last PDSCH prior to PUCCH #1, the UE uses this to determine whether to multiplex UCI of different L1 priority or not. In this example, the Mux Indicator is Enabled for SPS #3, even though SPS #2 Mux Indicator is Disabled, and so PUCCH #1 multiplexes HARQ-ACKs for SPS #1, SPS #2 and SPS #3, which are labelled as {ACK #1, ACK #2, ACK #3} respectively for the target PUCCH transmission 1420. Therefore, in contrast to the example shown in FIG. 13, the HARQ-ACK for SPS #2 is not deferred and is multiplexed into PUCCH #1 as represented by an arrow 1404 with a solid line. The HARQ-ACKs for SPS #4, SPS #5 and PDSCH #6 are scheduled in Slot n+4, which is carried by PUCCH #2 as for the example of FIG. 13. Although Mux Indicator is Enabled for SPS #5, since PDSCH #6 is the last PDSCH prior to PUCCH #2 and its Mux Indicator is Disabled, multiplexing of different L1 priorities are not performed. Hence, the UE performs prioritization, i.e. lower L1 priority UCIs are dropped and so PUCCH #2 carries only HP HARQ-ACKs for SPS #4 and PDSCH #6 which are labelled as {ACK #4, ACK #6} respectively for the target PUCCH transmission 1440. Therefore since the Mux indicator status of PDSCH #6 is used by the UE to determine whether it can multiplex HARQ-ACKs for different L1 priorities, in the example shown in FIG. 14, the HARQ-ACK for SPS #4 is not deferred, but transmitted in PUCCH #2 as represented by an arrow with a solid line 1406, whereas the HARQ-ACK for SPS #5 is deferred (or dropped if SPS HARQ-ACK deferral is not configured) as represented by an arrow with a dashed line 1412, because in this example, the Mux indicator for the PDSCH #6 is disabled and so the PUCCH can only carry HARQ-ACK's for the same priority, which in this example is high (HP).

In another embodiment, the PUCCH carrying multiplexed UCI of different L1 priorities is always selected from the PUCCH Resource Set configured for HP PUCCH, even if the PUCCH is scheduled dynamically with a Low L1 priority.

Figure 15:
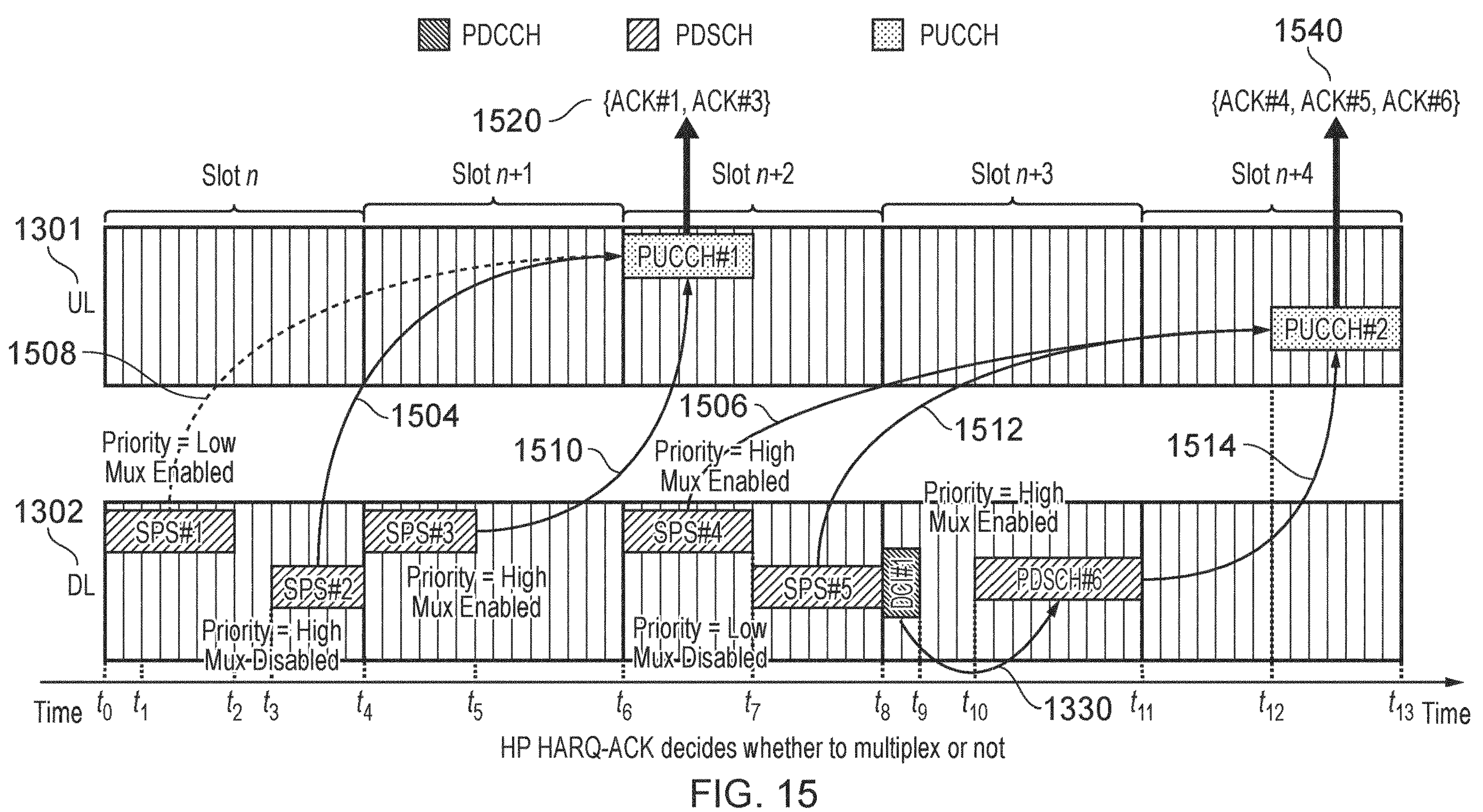
FIG. 15 is an illustrative representation of communications resources in time and frequency in which an uplink and downlink of the wireless access interface are formed in separate frequency channels as for FIG. 13 in which HARQ-ACK's are multiplexed into PUCCH in accordance with whether a physical L1 priority for transmitting the HARQ-ACK determines whether the HARQ-ACK can be multiplexed with other HARQ-ACK's into the PUCCH according to example embodiments.

In another embodiment, only HP HARQ-ACK can enable UCI multiplexing of different L1 priorities. In this embodiment, only if all HP HARQ-ACKs have Mux Indicator set as Enabled, then only LP HARQ-ACK can be multiplexed into the same PUCCHs. That is the Mux Indicator for LP HARQ-ACK is not utilized. Typically, in a configuration, especially those that are dynamically indicated, the Mux Indicator (DCI) field is present regardless of whether not the DCI schedules a LP or HP Uplink transmission and so in this example embodiment, if the Mux Indicator field is present for a DCI (or RRC configuration) that schedules LP uplink transmission, it is ignored. An example embodiment is shown FIG. 15, which again corresponds to the FDD scenario presented for the example embodiments of FIGS. 13 and 14 and so only the differences with respect to those embodiments will be described. According to the example embodiment shown in FIG. 15, at the HARQ-ACKs for SPS #1, SPS #2 and SPS #3 are scheduled in Slot n+2, which is carried by PUCCH #1, SPS #1 has LP HARQ-ACK whilst SPS #2 and SPS #3 have HP HARQ-ACKs. The Mux Indicator for SPS #2 is Disabled whilst that for SPS #3 is Enabled. As per this embodiment, even though Mux Indicator for SPS #1 is Enabled, prioritization is performed, i.e. LP HARQ-ACK is dropped for SPS #1, as represented by arrow with a dashed line 1508, and so PUCCH #1 carries only HP HARQ-ACK for SPS #2 and SPS #3 which are labelled as {ACK #2, ACK #3} respectively for the target PUCCH transmission 1520. Since in this example the HARQ-ACK for SPS #1 is for lower priority L1 data, the multiplexing of HARQ-ACKs of different L1 priority is not permitted and so the UE determines that it must drop (or defer) the HARQ-ACK for SPS #1, whilst it can multiplex the HARQ-ACK's for SPS #2 and SPS #3 as represented by arrows with a solid line 1504, 1510. The HARQ-ACKs for SPS #4, SPS #5 and PDSCH #6 are scheduled in Slot n+4 and carried by PUCCH #2. The Mux Indicator for SPS #4 and PDSCH #6 are set to Enabled whilst that for SPS #5 is set to Disabled. Since SPS #4 and PDSCH #6 are associated with HP HARQ-ACKs. PUCCH #2 multiplexes HARQ-ACKs of different L1 priorities, that is HARQ-ACKs for SPS #4, SPS #5 and PDSCH #6, which are labelled as {ACK #4, ACK #5, ACK #6} respectively as transmitted in the target PUCCH 1540. Therefore, according to this example since all of the high priority HARQ-ACKs have Mux Indicator enabled, the PUCCH carrying the UCI with the HARQ-ACKs can multiplex not only the high priority HARQ-ACKs but also the low priority HARQ-ACK and so arrows with solid lines 1506, 1512, 1514 all represent transmission of the HARQ-ACKs in the target PUCCH 1540.

Operation of a Communications Device

Figure 16:
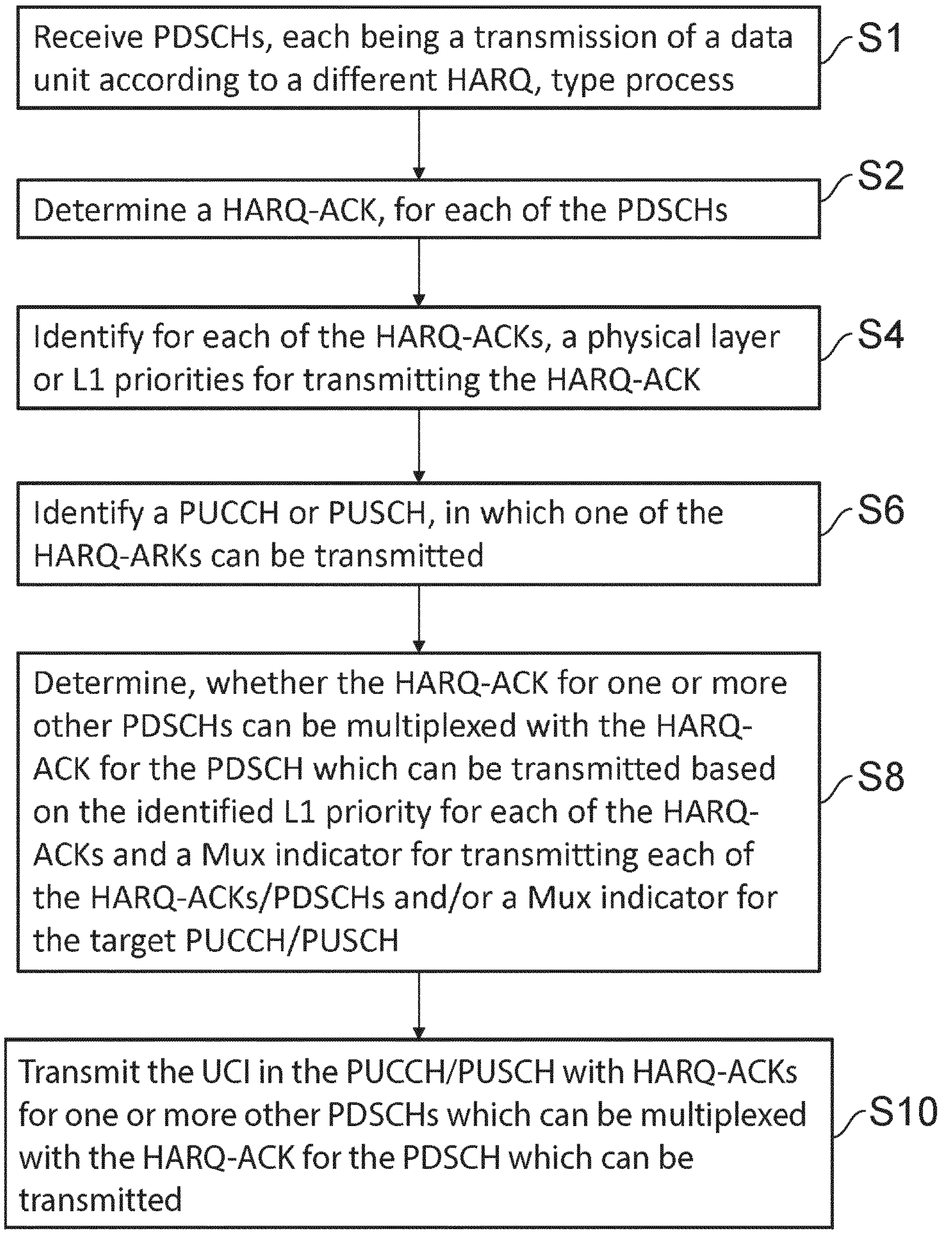
FIG. 16 is a flow diagram representing an operation of a communications device according to example embodiments.

FIG. 16 provides an example flow diagram illustrating an operation of a UE when implementing the embodiments described above. The flow diagram is summarized as follows:

S1: A UE receives a plurality of downlink transmissions in PDSCH resources, each of the plurality of downlink PDSCH transmissions being a transmission of a data unit according to a different HARQ process.

S2: The UE determines a HARQ acknowledgement or negative acknowledgement, HARQ-ACK, for each of the plurality of received downlink transmissions in accordance with whether the data unit for the HARQ process was correctly received or not.

S4: The UE then first identifies for each of the HARQ-ACKs, one of a plurality of different physical layer or L1 priorities for transmitting the HARQ-ACK.

S6: The UE identifies target uplink communications resource such as a PUCCH or PUSCH, in which one or more of the HARQ-ACKs can be transmitted for one of the plurality of the downlink transmissions as a first transmission of the HARQ-ACK for the received PDSCH transmission.

S8: The UE then determines whether the HARQ-ACK for one or more others of the plurality of the downlink transmissions can be multiplexed with the HARQ-ACK being transmitted as a first transmission of that HARQ-ACK for the received downlink transmission which can be transmitted in the target uplink communications resource as UCI.

S10: The UE transmits the UCI in the target uplink communications resource comprising the HARQ-ACK as a first transmission of the HARQ-ACK multiplexed with the HARQ-ACK for the one or more others of the plurality of the downlink transmissions, which may have been deferred from previous occasions in which the one or more HARQ-ACKs could not be transmitted in an initial uplink communications resource (PUCCH/PUSCH).

According to example embodiments, in step S8, the determining whether the HARQ-ACK for the one or more others of the plurality of the downlink transmissions can be multiplexed with the HARQ-ACK as a first transmission of the HARQ-ACK is based on a combination of the identified uplink physical layer priority for transmitting each of the HARQ-ACKs, and a Mux indicator for one or both of the target uplink communications resource for transmitting the uplink control information and each of the plurality of downlink transmissions identifying whether the HARQ-ACKs can be multiplexed.

Those skilled in the art will appreciate that references to "OFDM" apply to any type of OFDM-based modulation, including Cyclic Prefix OFDM (CP-OFDM), Discrete Fourier Transform Spread OFDM (DFT-S-OFDM) and Single Carrier Frequency Division Multiplexing (SC-FDM).

It will be appreciated that references to "time resource unit" may be any unit of communications resources in the time domain. For example, a time resource unit may be a slot or sub-slot as will be appreciated by one skilled in the art.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device to receive data from a wireless communications network, the method comprising receiving a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, determining a HARQ acknowledgement or negative acknowledgement, HARQ-ACK, for each of the plurality of received downlink transmissions in accordance with whether the data unit for the HARQ process was correctly received or not, identifying for each of the HARQ-ACKs one of a plurality of different physical layer priorities for transmitting the HARQ-ACK, identifying target uplink communications resource, in which one or more of the HARQ-ACKs can be transmitted for one of the plurality of the downlink transmissions as a first transmission of the HARQ-ACK for the received downlink transmission in the target uplink communications resource, determining whether the HARQ-ACK for one or more others of the plurality of the downlink transmissions can be multiplexed with the HARQ-ACK being transmitted as a first transmission for the received downlink transmission into the target uplink communications resource as uplink control information, and transmitting the uplink control information in the target uplink communications resource comprising a plurality of the HARQ-ACK for a plurality of the downlink transmissions, including the HARQ-ACK being transmitted as a first transmission, multiplexed together in the target uplink communications resource, wherein the determining whether the HARQ-ACK for the one or more others of the plurality of the downlink transmissions can be multiplexed with the HARQ-ACK being transmitted as a first transmission is based on a combination of the identified uplink physical layer priority for transmitting the HARQ-ACK for the one or more others of the plurality of the downlink transmissions and the HARQ-ACK being transmitted as a first transmission, and a multiplex, Mux, indicator for one or both of the target uplink communications resource for transmitting the uplink control information and each of the plurality of downlink transmissions.

Paragraph 2. A method according to paragraph 1, wherein the physical layer priority of the HARQ-ACK being transmitted as a first transmission in the target uplink communications resource is different to the physical layer priority of one or more of the HARQ-ACKs for the one or more others of the plurality of the downlink transmissions, which are multiplexed into the uplink control information and transmitted in the target uplink communications resource.

Paragraph 3. A method according to paragraph 1 or 2, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the uplink control information, and multiplexing the HARQ-ACK for the one or more others of the plurality of the downlink transmissions, if the Mux indicator is enabled.

Paragraph 4. A method according to paragraph 1 or 2, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the uplink control information, and multiplexing the HARQ-ACK for the one or more others of the plurality of the downlink transmissions, if the Mux indicator is enabled, and not multiplexing the HARQ-ACK for one or more others of the plurality of the downlink transmissions if the Mux indicator is disabled independent of the physical layer priority.

Paragraph 5. A method according to paragraph 1 or 2, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the uplink control information and the identified physical layer priority indicates a high priority, and multiplexing the HARQ-ACK for a plurality of the other downlink transmissions, if the identified physical layer priority indicates a high priority for one or more the plurality of downlink transmissions and the Mux indicator is enabled for all of the plurality of the other downlink transmissions.

Paragraph 6. A method according to paragraph 1, wherein the determining whether the HARQ-ACK for the one or more others of the plurality of the downlink transmissions can be multiplexed with the HARQ-ACK being transmitted as a first transmission, comprises if the Mux indicator is enabled for the target uplink communications resource for transmitting the HARQ-ACK being transmitted as a first transmission, multiplexing the HARQ-ACK for the one or more others of the plurality of the downlink transmissions in the target uplink communications resource as uplink control information with the HARQ-ACK being transmitted as a first transmission, or if the Mux indicator is disabled for the target uplink communications resource for transmitting the HARQ-ACK being transmitted as a first transmission and the physical layer priority of the HARQ-ACK being transmitted as a first transmission in the target uplink communications resource is the same as the physical layer priority of the HARQ-ACK for the one or more others of the plurality of the downlink transmissions, multiplexing the HARQ-ACK for the one or more others of the plurality of the downlink transmissions in the target uplink communications resource as uplink control information with the HARQ-ACK being transmitted as a first transmission.

Paragraph 7. A method according to paragraph 2, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the HARQ-ACK being transmitted as a first transmission, and multiplexing the HARQ-ACK for the one or more others of the plurality of the downlink transmissions in the target uplink communications resource as uplink control information with the HARQ-ACK being transmitted as a first transmission, the physical layer priority of the HARQ-ACK being transmitted as a first transmission, being different to the physical layer priority of the HARQ-ACK for the one or more others of the plurality of the downlink transmissions.

Paragraph 8. A method according to paragraph 7, wherein the identifying that the Mux indicator is enabled for the target uplink communications resource for transmitting the HARQ-ACK being transmitted as a first transmission, comprises identifying that the physical layer priority of the HARQ-ACK being transmitted as a first transmission, is high and interpreting the high physical layer priority as the Mux indicator for the target uplink communications resource as being enabled.

Paragraph 9. A method according to paragraph 7, wherein the identifying that the Mux indicator is enabled for the target uplink communications resource for transmitting the HARQ-ACK being transmitted as a first transmission, comprises identifying that the physical layer priority of the HARQ-ACK being transmitted as a first transmission, is high and the Mux indicator for the target uplink communications resource as being enabled.

Paragraph 10. A method according to paragraph 1 or 2, wherein the target uplink communications resource for transmitting the HARQ-ACK being transmitted as a first transmission of the HARQ-ACK is a physical uplink control channel, PUCCH, and the method comprises identifying that the Mux indicator is enabled for the target uplink communications resource for transmitting the HARQ-ACK being transmitted as a first transmission, and identifying that the physical layer priority of the HARQ-ACK being transmitted as a first transmission is low, and identifying that the physical layer priority of the HARQ-ACK for the one or more others of the plurality of the downlink transmissions is high priority, and if the Mux indicator is enabled and the physical layer priority is low for transmitting the HARQ-ACK being transmitted as a first transmission and the physical layer priority is high for transmitting the HARQ-ACK for the one or more other downlink transmissions, selecting a physical uplink control channel resource set for transmitting high priority HARQ-ACKs.

Paragraph 11. A method according to any of paragraphs 1 to 10, wherein the HARQ-ACK being transmitted as a first transmission of the HARQ-ACK, is a HARQ-ACK for a dynamic grant for the resources of the downlink shared channel indicated by downlink control information, and the one or more other downlink transmissions for which the HARQ-ACK multiplexed into the target uplink communications resource are semi-persistent scheduled downlink resources.

Paragraph 12. A method according to any of paragraphs 1 to 10, wherein the HARQ-ACK being transmitted as a first transmission of the HARQ-ACK and the one or more other downlink transmissions for which the HARQ-ACK multiplexed into the target uplink communications resource are semi-persistent scheduled downlink resources.

Paragraph 13. A method according to any of paragraphs 1 to 10, wherein the determining, whether the HARQ-ACK for the one or more others of the plurality of the downlink transmissions can be multiplexed with the HARQ-ACK being transmitted as a first transmission of the HARQ-ACK, includes identifying, for each of the one or more others of the plurality of downlink transmissions, initial uplink communications resource of the wireless access interface for transmitting the HARQ-ACK for the downlink transmission, determining that the HARQ-ACK for each of the one or more other downlink transmissions cannot be transmitted in the initial uplink communications resource and must be deferred, and for each HARQ-ACK for the one or more other downlink transmissions which must be deferred. determining whether the HARQ-ACK can be multiplexed in the uplink communications resource with the HARQ-ACK being transmitted as a first transmission for the HARQ-ACK.

Paragraph 14. A method according to paragraph 13, wherein the plurality of downlink transmissions in physical downlink shared channel resources of the wireless access interface are pre-configured downlink shared channel resources by the wireless communications network, and the identifying, for each of the one or more others of the plurality of downlink transmissions, the initial uplink communications resource of the wireless access interface for transmitting the HARQ-ACK for the downlink transmission comprises identifying uplink communications resource as a configured time offset with respect to the pre-configured downlink shared channel resource, and the determining that the HARQ-ACK for each of the one or more other downlink transmissions cannot be transmitted in the initial uplink communications resource and must be deferred comprises identifying that the initial uplink communications resource for transmitting the HARQ-ACK includes communications resource which cannot be used.

Paragraph 15. A method according to paragraph 14, wherein the communications resource for receiving the downlink transmissions in the downlink shared channel resource is on the same frequency channel as the initial uplink communications resource of the wireless access interface, the wireless access interface being time division duplex, and the identifying that the initial uplink communications resource for transmitting the HARQ-ACK for the one or more other downlink transmissions includes communications resource which cannot be used comprises identifying that the communications resource is invalid or allocated for downlink resources.

Paragraph 16. A method according to paragraph 2, wherein the determining whether the HARQ-ACK for the one or more others of the plurality of the downlink transmissions can be multiplexed with the HARQ-ACK as a first transmission of the HARQ-ACK comprises identifying a last of the downlink transmissions in the shared downlink physical resources to be transmitted, determining that the HARQ-ACK for the downlink transmission which can be transmitted as a first transmission of the HARQ-ACK, is associated with the last of the downlink transmissions in the shared downlink physical resources, and multiplexing the HARQ-ACK for the one or more others of the plurality of downlink transmissions into the uplink control information transmitted in the identified uplink resources depending on the Mux indicator of the HARQ-ACK for the last downlink transmission.

Paragraph 17. A method according to paragraph 16, wherein the multiplexing the HARQ-ACK for the one or more others of the plurality of downlink transmissions into the uplink control information transmitted in the identified uplink resources, comprises identifying that the Mux indicator is enabled for transmitting the HARQ-ACK for the last downlink transmission, and if the Mux indicator is enabled, multiplexing the HARQ-ACK for the one or more others of the plurality of downlink transmissions into the uplink control information transmitted in the identified uplink resources with different or the same physical layer priority is independent of whether the Mux indicator for the one or more other downlink transmissions is enabled or disabled.

Paragraph 18. A method according to paragraph 16, wherein the multiplexing the HARQ-ACK for the one or more others of the plurality of downlink transmissions into the uplink control information transmitted in the identified uplink resources comprises identifying that the Mux indicator is disabled for transmitting the HARQ-ACK for the last downlink transmission, and if the Mux indicator is disabled, multiplexing the HARQ-ACK for the one or more others of the plurality of downlink transmissions into the uplink control information transmitted in the identified uplink resources when the physical layer priority is the same as that of the HARQ-ACK for the last downlink transmission independent of whether the Mux indicator for the one or more other downlink transmissions is enabled or disabled.

Paragraph 19. A method according to paragraph 2, wherein the determining whether the HARQ-ACK for the one or more others of the plurality of the downlink transmissions can be multiplexed with the HARQ-ACK as a first transmission of the HARQ-ACK, comprises identifying that the Mux indicator is enabled for transmitting the HARQ-ACK for the downlink transmission which can be transmitted as a first transmission of the HARQ-ACK, and identifying that the physical layer priority of the HARQ-ACK as a first transmission of the HARQ-ACK is high priority, identifying that for each of the one or more others of the plurality of downlink transmissions with a high physical layer priority for transmitting the HARQ-ACK, the Mux indicator is enabled, and multiplexing the HARQ-ACK for the one or more others of the plurality of the downlink transmissions with the HARQ-ACK as a first transmission of the HARQ-ACK whether the physical layer priority is high or low.

Paragraph 20. A communications device for receiving data from a wireless communications network, the communications device comprising controller circuitry and transceiver circuitry configured such that the communications device is operable to:

receive a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, determine a HARQ acknowledgement or negative acknowledgement, HARQ-ACK, for each of the plurality of received downlink transmissions in accordance with whether the data unit for the HARQ process was correctly received or not, identify for each of the HARQ-ACKs one of a plurality of different physical layer priorities for transmitting the HARQ-ACK, identify target uplink communications resource, in which one or more of the HARQ-ACKs can be transmitted for one of the plurality of the downlink transmissions as a first transmission of the HARQ-ACK for the received downlink transmission in the target uplink communications resource, determine whether the HARQ-ACK for one or more others of the plurality of the downlink transmissions can be multiplexed with the HARQ-ACK being transmitted as a first transmission for the received downlink transmission into the target uplink communications resource as uplink control information, and transmit the uplink control information in the target uplink communications resource comprising a plurality of the HARQ-ACK for a plurality of the downlink transmissions, including the HARQ-ACK being transmitted as a first transmission, multiplexed together in the target uplink communications resource, wherein the communications device is configured to determine whether the HARQ-ACK for the one or more others of the plurality of the downlink transmissions can be multiplexed with the HARQ-ACK being transmitted as a first transmission based on a combination of the identified uplink physical layer priority for transmitting the HARQ-ACK for the one or more others of the plurality of the downlink transmissions and the HARQ-ACK being transmitted as a first transmission, and a multiplex, Mux, indicator for one or both of the target uplink communications resource for transmitting the uplink control information and each of the plurality of downlink transmissions.

Paragraph 21. Circuitry for a communications device for receiving data from a wireless communications network, the circuitry comprising controller circuitry and transceiver circuitry configured such that the circuitry is operable to:

receive a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, determine a HARQ acknowledgement or negative acknowledgement, HARQ-ACK, for each of the plurality of received downlink transmissions in accordance with whether the data unit for the HARQ process was correctly received or not, identify for each of the HARQ-ACKs one of a plurality of different physical layer priorities for transmitting the HARQ-ACK, identify target uplink communications resource, in which one or more of the HARQ-ACKs can be transmitted for one of the plurality of the downlink transmissions as a first transmission of the HARQ-ACK for the received downlink transmission in the target uplink communications resource, determine whether the HARQ-ACK for one or more others of the plurality of the downlink transmissions can be multiplexed with the HARQ-ACK being transmitted as a first transmission for the received downlink transmission into the target uplink communications resource as uplink control information, and transmit the uplink control information in the target uplink communications resource comprising a plurality of the HARQ-ACK for a plurality of the downlink transmissions, including the HARQ-ACK being transmitted as a first transmission, multiplexed together in the target uplink communications resource, wherein the communications device is configured to determine whether the HARQ-ACK for the one or more others of the plurality of the downlink transmissions can be multiplexed with the HARQ-ACK being transmitted as a first transmission based on a combination of the identified uplink physical layer priority for transmitting the HARQ-ACK for the one or more others of the plurality of the downlink transmissions and the HARQ-ACK being transmitted as a first transmission, and a multiplex, Mux, indicator for one or both of the target uplink communications resource for transmitting the uplink control information and each of the plurality of downlink transmissions.

Paragraph 22. A method of operating network infrastructure equipment to transmit data to a communications device in a wireless communications network, the method comprising transmitting to the communications device a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, and receiving uplink control information from the communications device in a target uplink communications resource comprising a plurality of HARQ-ACK for a plurality of the downlink transmissions, including a HARQ-ACK being transmitted by the communications device as a first transmission, multiplexed together in the target uplink communications resource, wherein whether the HARQ-ACK being transmitted by the communications device as a first transmission and the other HARQ-ACK for the plurality of the downlink transmissions are multiplexed together is based on a combination of an uplink physical layer priority for the HARQ-ACK and a multiplex, Mux, indicator for one or both of the target uplink communications resource for transmitting the uplink control information and each of the plurality of downlink transmissions.

Paragraph 23. Network infrastructure equipment for transmitting data to a communications device in a wireless communications network, the network infrastructure equipment comprising controller circuitry and transceiver circuitry configured such that the network infrastructure equipment is operable to:

transmit to the communications device a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, and receive uplink control information from the communications device in a target uplink communications resource comprising a plurality of HARQ-ACK for a plurality of the downlink transmissions, including a HARQ-ACK being transmitted by the communications device as a first transmission, multiplexed together in the target uplink communications resource, wherein whether the HARQ-ACK being transmitted by the communications device as a first transmission and the other HARQ-ACK for the plurality of the downlink transmissions are multiplexed together is based on a combination of an uplink physical layer priority for the HARQ-ACK and a multiplex, Mux, indicator for one or both of the target uplink communications resource for transmitting the uplink control information and each of the plurality of downlink transmissions.

Paragraph 24. Circuitry for network infrastructure equipment for transmitting data to a communications device in a wireless communications network, the circuitry comprising controller circuitry and transceiver circuitry configured such that the circuitry is operable to:

transmit to the communications device a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, and receive uplink control information from the communications device in a target uplink communications resource comprising a plurality of HARQ-ACK for a plurality of the downlink transmissions, including a HARQ-ACK being transmitted by the communications device as a first transmission, multiplexed together in the target uplink communications resource, wherein whether the HARQ-ACK being transmitted by the communications device as a first transmission and the other HARQ-ACK for the plurality of the downlink transmissions are multiplexed together is based on a combination of an uplink physical layer priority for the HARQ-ACK and a multiplex, Mux, indicator for one or both of the target uplink communications resource for transmitting the uplink control information and each of the plurality of downlink transmissions.

Paragraph 25. A wireless communications system comprising a communications device according to Paragraph 20 and network infrastructure equipment according to Paragraph 23.

Paragraph 26. A computer program comprising instructions which, when loaded onto a computer, cause the computer to perform a method according to Paragraph 1 or Paragraph 22.

Paragraph 27. A non-transitory computer-readable storage medium storing a computer program according to Paragraph 26.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] TR 38.913. "Study on Scenarios and Requirements for Next Generation Access Technologies (Release 14)", third Generation Partnership Project, v14.3.0.

[3] RP-190726, "Physical layer enhancements for NR ultra-reliable and low latency communication (URLLC)", Huawei, HiSilicon, RAN #83.

[4] RP-201310, "Revised WID: Enhanced Industrial Internet of Things (IoT) and ultra-reliable and low latency communication (URLLC) support for NR," Nokia, Nokia Shanghai Bell, RAN #88e.

[5] R1-2106962, "UE feedback enhancements for HARQ-ACK," CATT, RAN1 #106e

[6] R1-2106636, "HARQ-ACK Feedback Enhancements for URLLC/IIoT," Nokia, Nokia Shanghai Bell, RAN1 #106e

[7] European patent application number 20155210.6, "Intra-UE Multiplexing Indicator".

What is claimed is:

1. A method of operating a communications device to receive data from a wireless communications network, the method comprising receiving a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, determining a HARQ acknowledgement or negative acknowledgement, HARQ-ACK, for each of the plurality of received downlink transmissions in accordance with whether the data unit for the HARQ process was correctly received or not, identifying for each of the HARQ-ACKs one of a plurality of different physical layer priorities for transmitting the HARQ-ACK, identifying target uplink communications resource, in which one or more of the HARQ-ACKs can be transmitted for one of the plurality of the downlink transmissions as a first transmission of the HARQ-ACK for the received downlink transmission in the target uplink communications resource, determining whether the HARQ-ACK for one or more others of the plurality of the downlink transmissions can be multiplexed with the HARQ-ACK being transmitted as a first transmission for the received downlink transmission into the target uplink communications resource as uplink control information, and transmitting the uplink control information in the target uplink communications resource comprising a plurality of the HARQ-ACK for a plurality of the downlink transmissions, including the HARQ-ACK being transmitted as a first transmission, multiplexed together in the target uplink communications resource, wherein the determining whether the HARQ-ACK for the one or more others of the plurality of the downlink transmissions can be multiplexed with the HARQ-ACK being transmitted as a first transmission is based on a combination of the identified uplink physical layer priority for transmitting the HARQ-ACK for the one or more others of the plurality of the downlink transmissions and the HARQ-ACK being transmitted as a first transmission, and a multiplex, Mux, indicator for one or both of the target uplink communications resource for transmitting the uplink control information and each of the plurality of downlink transmissions.

2. A method according to claim 1, wherein the physical layer priority of the HARQ-ACK being transmitted as a first transmission in the target uplink communications resource is different to the physical layer priority of one or more of the HARQ-ACKs for the one or more others of the plurality of the downlink transmissions, which are multiplexed into the uplink control information and transmitted in the target uplink communications resource.

3. A method according to claim 2, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the HARQ-ACK being transmitted as a first transmission, and multiplexing the HARQ-ACK for the one or more others of the plurality of the downlink transmissions in the target uplink communications resource as uplink control information with the HARQ-ACK being transmitted as a first transmission, the physical layer priority of the HARQ-ACK being transmitted as a first transmission, being different to the physical layer priority of the HARQ-ACK for the one or more others of the plurality of the downlink transmissions.

4. A method according to claim 3, wherein the identifying that the Mux indicator is enabled for the target uplink communications resource for transmitting the HARQ-ACK being transmitted as a first transmission, comprises identifying that the physical layer priority of the HARQ-ACK being transmitted as a first transmission, is high and interpreting the high physical layer priority as the Mux indicator for the target uplink communications resource as being enabled.

5. A method according to claim 3, wherein the identifying that the Mux indicator is enabled for the target uplink communications resource for transmitting the HARQ-ACK being transmitted as a first transmission, comprises identifying that the physical layer priority of the HARQ-ACK being transmitted as a first transmission, is high and the Mux indicator for the target uplink communications resource as being enabled.

6. A method according to claim 2, wherein the determining whether the HARQ-ACK for the one or more others of the plurality of the downlink transmissions can be multiplexed with the HARQ-ACK as a first transmission of the HARQ-ACK comprises identifying a last of the downlink transmissions in the shared downlink physical resources to be transmitted, determining that the HARQ-ACK for the downlink transmission which can be transmitted as a first transmission of the HARQ-ACK, is associated with the last of the downlink transmissions in the shared downlink physical resources, and multiplexing the HARQ-ACK for the one or more others of the plurality of downlink transmissions into the uplink control information transmitted in the identified uplink resources depending on the Mux indicator of the HARQ-ACK for the last downlink transmission.

7. A method according to claim 6, wherein the multiplexing the HARQ-ACK for the one or more others of the plurality of downlink transmissions into the uplink control information transmitted in the identified uplink resources, comprises identifying that the Mux indicator is enabled for transmitting the HARQ-ACK for the last downlink transmission, and if the Mux indicator is enabled, multiplexing the HARQ-ACK for the one or more others of the plurality of downlink transmissions into the uplink control information transmitted in the identified uplink resources with different or the same physical layer priority is independent of whether the Mux indicator for the one or more other downlink transmissions is enabled or disabled.

8. A method according to claim 6, wherein the multiplexing the HARQ-ACK for the one or more others of the plurality of downlink transmissions into the uplink control information transmitted in the identified uplink resources comprises identifying that the Mux indicator is disabled for transmitting the HARQ-ACK for the last downlink transmission, and if the Mux indicator is disabled, multiplexing the HARQ-ACK for the one or more others of the plurality of downlink transmissions into the uplink control information transmitted in the identified uplink resources when the physical layer priority is the same as that of the HARQ-ACK for the last downlink transmission independent of whether the Mux indicator for the one or more other downlink transmissions is enabled or disabled.

9. A method according to claim 1, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the uplink control information, and multiplexing the HARQ-ACK for the one or more others of the plurality of the downlink transmissions, if the Mux indicator is enabled.

10. A method according to claim 1, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the uplink control information, and multiplexing the HARQ-ACK for the one or more others of the plurality of the downlink transmissions, if the Mux indicator is enabled, and not multiplexing the HARQ-ACK for one or more others of the plurality of the downlink transmissions if the Mux indicator is disabled independent of the physical layer priority.

11. A method according to claim 1, wherein the determining whether the HARQ-ACK for the one or more others of the plurality of the downlink transmissions can be multiplexed with the HARQ-ACK being transmitted as a first transmission, comprises identifying that the Mux indicator is enabled for the target uplink communications resource for transmitting the uplink control information and the identified physical layer priority indicates a high priority, and multiplexing the HARQ-ACK for a plurality of the other downlink transmissions, if the identified physical layer priority indicates a high priority for one or more the plurality of downlink transmissions and the Mux indicator is enabled for all of the plurality of the other downlink transmissions.

12. A method according to claim 1, wherein the determining whether the HARQ-ACK for the one or more others of the plurality of the downlink transmissions can be multiplexed with the HARQ-ACK being transmitted as a first transmission, comprises if the Mux indicator is enabled for the target uplink communications resource for transmitting the HARQ-ACK being transmitted as a first transmission, multiplexing the HARQ-ACK for the one or more others of the plurality of the downlink transmissions in the target uplink communications resource as uplink control information with the HARQ-ACK being transmitted as a first transmission, or if the Mux indicator is disabled for the target uplink communications resource for transmitting the HARQ-ACK being transmitted as a first transmission and the physical layer priority of the HARQ-ACK being transmitted as a first transmission in the target uplink communications resource is the same as the physical layer priority of the HARQ-ACK for the one or more others of the plurality of the downlink transmissions, multiplexing the HARQ-ACK for the one or more others of the plurality of the downlink transmissions in the target uplink communications resource as uplink control information with the HARQ-ACK being transmitted as a first transmission.

13. A method according to claim 1, wherein the target uplink communications resource for transmitting the HARQ-ACK being transmitted as a first transmission of the HARQ-ACK is a physical uplink control channel, PUCCH, and the method comprises identifying that the Mux indicator is enabled for the target uplink communications resource for transmitting the HARQ-ACK being transmitted as a first transmission, and identifying that the physical layer priority of the HARQ-ACK being transmitted as a first transmission is low, and identifying that the physical layer priority of the HARQ-ACK for the one or more others of the plurality of the downlink transmissions is high priority, and if the Mux indicator is enabled and the physical layer priority is low for transmitting the HARQ-ACK being transmitted as a first transmission and the physical layer priority is high for transmitting the HARQ-ACK for the one or more other downlink transmissions, selecting a physical uplink control channel resource set for transmitting high priority HARQ-ACKs.

14. A method according to claim 1, wherein the HARQ-ACK being transmitted as a first transmission of the HARQ-ACK, is a HARQ-ACK for a dynamic grant for the resources of the downlink shared channel indicated by downlink control information, and the one or more other downlink transmissions for which the HARQ-ACK multiplexed into the target uplink communications resource are semi-persistent scheduled downlink resources.

15. A method according to claim 1, wherein the HARQ-ACK being transmitted as a first transmission of the HARQ-ACK and the one or more other downlink transmissions for which the HARQ-ACK multiplexed into the target uplink communications resource are semi-persistent scheduled downlink resources.

16. A method according to claim 1, wherein the determining, whether the HARQ-ACK for the one or more others of the plurality of the downlink transmissions can be multiplexed with the HARQ-ACK being transmitted as a first transmission of the HARQ-ACK, includes identifying, for each of the one or more others of the plurality of downlink transmissions, initial uplink communications resource of the wireless access interface for transmitting the HARQ-ACK for the downlink transmission, determining that the HARQ-ACK for each of the one or more other downlink transmissions cannot be transmitted in the initial uplink communications resource and must be deferred, and for each HARQ-ACK for the one or more other downlink transmissions which must be deferred, determining whether the HARQ-ACK can be multiplexed in the uplink communications resource with the HARQ-ACK being transmitted as a first transmission for the HARQ-ACK.

17. A method according to claim 16, wherein the plurality of downlink transmissions in physical downlink shared channel resources of the wireless access interface are pre-configured downlink shared channel resources by the wireless communications network, and the identifying, for each of the one or more others of the plurality of downlink transmissions, the initial uplink communications resource of the wireless access interface for transmitting the HARQ-ACK for the downlink transmission comprises identifying uplink communications resource as a configured time offset with respect to the pre-configured downlink shared channel resource, and the determining that the HARQ-ACK for each of the one or more other downlink transmissions cannot be transmitted in the initial uplink communications resource and must be deferred comprises identifying that the initial uplink communications resource for transmitting the HARQ-ACK includes communications resource which cannot be used.

18. A method according to claim 17, wherein the communications resource for receiving the downlink transmissions in the downlink shared channel resource is on the same frequency channel as the initial uplink communications resource of the wireless access interface, the wireless access interface being time division duplex, and the identifying that the initial uplink communications resource for transmitting the HARQ-ACK for the one or more other downlink transmissions includes communications resource which cannot be used comprises identifying that the communications resource is invalid or allocated for downlink resources.

19. A communications device for receiving data from a wireless communications network, the communications device comprising controller circuitry and transceiver circuitry configured such that the communications device is operable to:

receive a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, determine a HARQ acknowledgement or negative acknowledgement, HARQ-ACK, for each of the plurality of received downlink transmissions in accordance with whether the data unit for the HARQ process was correctly received or not, identify for each of the HARQ-ACKs one of a plurality of different physical layer priorities for transmitting the HARQ-ACK, identify target uplink communications resource, in which one or more of the HARQ-ACKs can be transmitted for one of the plurality of the downlink transmissions as a first transmission of the HARQ-ACK for the received downlink transmission in the target uplink communications resource, determine whether the HARQ-ACK for one or more others of the plurality of the downlink transmissions can be multiplexed with the HARQ-ACK being transmitted as a first transmission for the received downlink transmission into the target uplink communications resource as uplink control information, and transmit the uplink control information in the target uplink communications resource comprising a plurality of the HARQ-ACK for a plurality of the downlink transmissions, including the HARQ-ACK being transmitted as a first transmission, multiplexed together in the target uplink communications resource, wherein the communications device is configured to determine whether the HARQ-ACK for the one or more others of the plurality of the downlink transmissions can be multiplexed with the HARQ-ACK being transmitted as a first transmission based on a combination of the identified uplink physical layer priority for transmitting the HARQ-ACK for the one or more others of the plurality of the downlink transmissions and the HARQ-ACK being transmitted as a first transmission, and a multiplex, Mux, indicator for one or both of the target uplink communications resource for transmitting the uplink control information and each of the plurality of downlink transmissions.

20. Network infrastructure equipment for transmitting data to a communications device in a wireless communications network, the network infrastructure equipment comprising controller circuitry and transceiver circuitry configured such that the network infrastructure equipment is operable to:

transmit to the communications device a plurality of downlink transmissions in physical downlink shared channel, PDSCH, resources of a wireless access interface provided by the wireless communications network, each of the plurality of downlink transmissions being a transmission of a data unit according to a different Hybrid Automatic Repeat Request, HARQ, process, one or more of the downlink transmissions being in pre-configured communications resources of the PDSCH, and receive uplink control information from the communications device in a target uplink communications resource comprising a plurality of HARQ-ACK for a plurality of the downlink transmissions, including a HARQ-ACK being transmitted by the communications device as a first transmission, multiplexed together in the target uplink communications resource, wherein whether the HARQ-ACK being transmitted by the communications device as a first transmission and the other HARQ-ACK for the plurality of the downlink transmissions are multiplexed together is based on a combination of an uplink physical layer priority for the HARQ-ACK and a multiplex, Mux, indicator for one or both of the target uplink communications resource for transmitting the uplink control information and each of the plurality of downlink transmissions.

* * * * *